US012755661B2

(12) United States Patent
Liu et al.

(10) Patent No.: US 12,755,661 B2
(45) Date of Patent: Oct. 6, 2026

(54) APPARATUS AND METHOD FOR IMAGE COMPENSATION, DISPLAY DRIVER AND DISPLAY

(71) Applicant: Beijing ESWIN Computing Technology Co., Ltd., Beijing (CN)

(72) Inventors: Zheng Liu, Beijing (CN); Xiumin Gao, Beijing (CN); Qiang Liu, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 0 days.

(21) Appl. No.: 18/942,556

(22) Filed: Nov. 9, 2024

(65) Prior Publication Data

US 2025/0391299 A1 Dec. 25, 2025

(30) Foreign Application Priority Data

Jun. 21, 2024 (CN) ......................... 202410809607.8

(51) Int. Cl.
*G09G 3/00* (2006.01)

(52) U.S. Cl.
CPC ....... *G09G 3/03* (2020.08); *G09G 2310/0202* (2013.01); *G09G 2320/0233* (2013.01);
(Continued)

(58) Field of Classification Search
CPC ............. G09G 3/03; G09G 2310/0202; G09G 2320/0233; G09G 2320/0242; G09G 2320/103; G09G 3/2003; G09G 2320/0666
See application file for complete search history.

(56) References Cited

U.S. PATENT DOCUMENTS 5,625,373 A * 4/1997 Johnson ............... G09G 3/3611 345/100
11,705,029 B1 * 7/2023 Zhang .................. G09G 3/3225 345/694
(Continued)

FOREIGN PATENT DOCUMENTS

CN 109448660 A * 3/2019 ........... G09G 3/3607
CN 112947885 A * 6/2021 ............. G06F 3/147
(Continued)

*Primary Examiner* — Temesghen Ghebretinsae
*Assistant Examiner* — Karin Kiyabu
(74) *Attorney, Agent, or Firm* — Syncoda LLC; Feng Ma

(57) ABSTRACT

An apparatus and method for image compensation, a display driver, and a display are provided. The image compensation apparatus is applied to an electronic device with a curved screen and includes: a coordinate determination unit, configured to determine a row coordinate and a column coordinate for each of at least one pixel; a compensation coefficient determination unit, configured to: symmetrically map a row coordinate and a column coordinate of each of pixels located in an edge region of the curved screen, respectively, to obtain a target row coordinate and a target column coordinate of the pixel, and determine a compensation coefficient of the pixel based on the target row coordinate or the target column coordinate of the pixel; and a compensation unit, configured to determine a target pixel value of the pixel based on the compensation coefficient of the pixel and an original pixel value of the pixel.

20 Claims, 12 Drawing Sheets

(52) U.S. Cl.
CPC ............... *G09G 2320/0242* (2013.01); *G09G 2320/103* (2013.01)

(56) References Cited

U.S. PATENT DOCUMENTS

| | | | | |
|---|---|---|---|---|
| 2014/0225936 | A1* | 8/2014 | Hosaka | G09G 3/3648<br>345/89 |
| 2017/0262967 | A1* | 9/2017 | Russell | G06T 5/80 |
| 2019/0378251 | A1* | 12/2019 | Hsu | G06T 11/23 |
| 2021/0241670 | A1* | 8/2021 | Orio | G02B 27/0093 |
| 2021/0335223 | A1* | 10/2021 | Shen | G09G 3/3208 |
| 2022/0130314 | A1* | 4/2022 | Hong | G09G 3/2003 |
| 2024/0282254 | A1* | 8/2024 | Lee | G09G 3/2074 |

FOREIGN PATENT DOCUMENTS

| | | | | | |
|---|---|---|---|---|---|
| CN | 113077759 | A | * | 7/2021 | G09G 3/3225 |
| CN | 113269697 | A | * | 8/2021 | G06T 11/26 |
| CN | 114792288 | A | * | 7/2022 | G06T 7/90 |
| CN | 115499629 | A | * | 12/2022 | H04N 9/73 |
| CN | 112634173 | B | * | 12/2023 | G06T 7/136 |
| CN | 121565086 | A | * | 2/2026 | G09G 3/2022 |

* cited by examiner

APPARATUS AND METHOD FOR IMAGE COMPENSATION, DISPLAY DRIVER AND DISPLAY

CROSS-REFERENCE TO RELATED APPLICATION

This application claims priority to Chinese patent application No. 202410809607.8 filed on Jun. 21, 2024, the disclosure of which is hereby incorporated by reference in its entirety.

BACKGROUND

With the continuous development of science and technology, the curved screen has been widely applied in various electronic devices, such as smart phones, smart watches, and so on. The curved screen has improved the user experience in many aspects. For example, when used in smart phones, the overall curved design of the curved screen is conducive to holding, fits better with the curvature of the palm, reduces the distance that the thumb touches the screen when operating with one hand, and helps to improve the experience of horizontal cross-screen operation on large-size screens, etc.

However, while improving the user experience, the curved screen also presents some problems such as poor optical uniformity, especially for the curved portion located at the edge of the screen, where there is often a certain color deviation phenomenon.

SUMMARY

The disclosure relates to the field of image processing technology, in particular to an apparatus and method for image compensation, a display driver and a display.

According to a first aspect, an embodiment of the disclosure provides an apparatus for image compensation, which is applied to an electronic device with a curved screen and includes a processor; and a memory configured to store an instruction executable on the processor.

The processor is configured to:

- determine a row coordinate and a column coordinate for each of at least one pixel.
- symmetrically map a row coordinate of each of pixels, located in an edge region of the curved screen, of the at least one pixel, to obtain a target row coordinate of the pixel; symmetrically map a column coordinate of each of the pixels to obtain a target column coordinate of the pixel; and determine a compensation coefficient of the pixel based on the target row coordinate of the pixel or the target column coordinate of the pixel; and
- determine a target pixel value of the pixel based on the compensation coefficient of the pixel and an original pixel value of the pixel.

According to a second aspect, an embodiment of the disclosure provides a method for image compensation, which is applied to an electronic device with a curved screen and includes the following operations.

A row coordinate and a column coordinate for each of at least one pixel are determined.

The row coordinate of the pixel is symmetrically mapped to obtain a target row coordinate of the pixel, and the column coordinate of the pixel is symmetrically mapped to obtain a target column coordinate of the pixel.

Whether the pixel is located in an edge region of the curved screen is determined.

In case that the pixel is located in the edge region, a compensation coefficient of the pixel is determined based on the target row coordinate of the pixel or the target column coordinate of the pixel.

A target pixel value of the pixel is determined based on the compensation coefficient of the pixel and original pixel value of the pixel.

In a third aspect, an embodiment of the disclosure provides a display, which includes the apparatus for image compensation. The apparatus is applied to an electronic device with a curved screen and includes a processor; and a memory configured to store an instruction executable on the processor.

The processor is configured to:

- determine a row coordinate and a column coordinate for each of at least one pixel.
- symmetrically map a row coordinate of each of pixels, located in an edge region of the curved screen, of the at least one pixel, to obtain a target row coordinate of the pixel; symmetrically map a column coordinate of each of the pixels to obtain a target column coordinate of the pixel; and determine a compensation coefficient of the pixel based on the target row coordinate of the pixel or the target column coordinate of the pixel; and
- determine a target pixel value of the pixel based on the compensation coefficient of the pixel and an original pixel value of the pixel.

DETAILED DESCRIPTION

Figure 1:
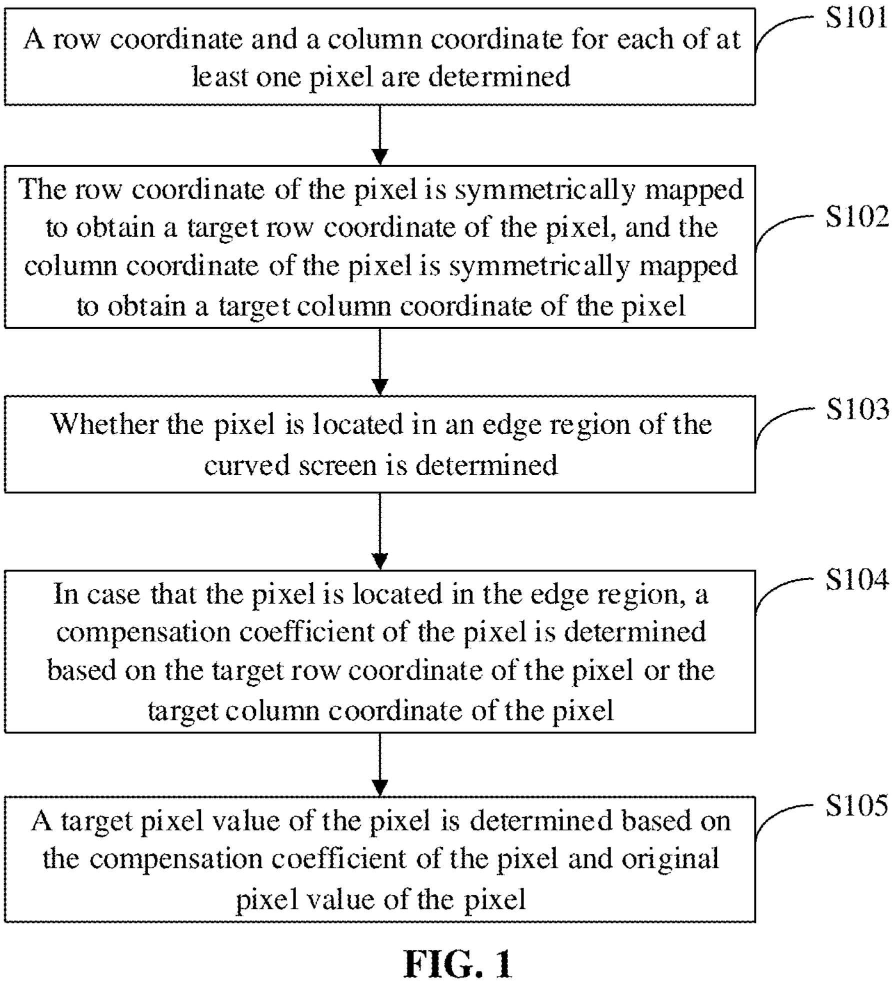
FIG. 1 is a schematic flowchart of a method for image compensation according to an embodiment of the disclosure.

The technical solutions in embodiments of the disclosure will be clearly and completely described below with reference to the accompanying drawings in embodiment of the disclosure. It is to be understood that the specific embodiments described herein are intended only to explain the related disclosure and do not constitute a limitation of the disclosure. It should also be noted that, for convenience of description, only the parts relevant to the related disclosure are illustrated in the accompanying drawings.

Unless otherwise defined, all technical and scientific terms used herein have the same meaning as commonly understood by those skilled in the technical field of the disclosure. The terminology used herein is for the purpose of describing the embodiments of the disclosure only and is not intended to limit the disclosure.

In the following description, reference is made to "some embodiments", which describes a subset of all possible embodiments, but it is to be understood that "some embodiments" may be a same subset or different subsets of all possible embodiments, and may be combined with each other without conflict.

It should be noted that the terms "first/second/third" involved in the embodiments of the disclosure are merely to distinguish similar objects and do not represent a specific ordering for the objects. It is to be understood that "first/second/third" may be interchanged with a specific order or a priority order where permitted, so that the embodiments of the disclosure described herein can be implemented in an order other than that illustrated or described herein.

For a curved screen, there is often the problem of color deviation in the curved part. Based on this, embodiments of the disclosure provides a method for image compensation, which is applied to an electronic device with a curved screen and includes the following operations. A row coordinate and a column coordinate for each of at least one pixel are determined. The row coordinate of the pixel is symmetrically mapped to obtain a target row coordinate of the pixel, and the column coordinate of the pixel is symmetrically mapped to obtain a target column coordinate of the pixel. Whether the pixel is located in an edge region of the curved screen is determined; and in case that the pixel is located in the edge region, a compensation coefficient of the pixel is determined based on the target row coordinate of the pixel or the target column coordinate of the pixel. A target pixel value of the pixel is determined based on the compensation coefficient of the pixel and original pixel value of the pixel.

In this way, the embodiments of the disclosure can realize multi-channel image transmission (that is, the row coordinates and the column coordinates of multiple pixels in a row of pixels can be obtained simultaneously in multiple channels, and at the same time, the way of obtaining the row coordinate and the column coordinate of only one pixel in a single channel can still be well applicable). Based on multi-channel image transmission, the pixels on both symmetrical sides of the curved screen are mapped to the same pixel by symmetrically mapping the row coordinates and the column coordinates of the pixels, and a same compensation coefficient is adopted for symmetrical pixels, so that not only image transmission is sped up, but also the time required for calculating the compensation coefficients is saved. The compensation coefficients are calculated for the edge region to perform the color deviation compensation; and a real-time edge-compensated image result is output, and when presented on the screen, these results can address the problem of color deviation at the edge of the curved screen. Ultimately, the color deviation phenomenon of the curved screen and the display performance of the curved screen can be improved while satisfying the real-time processing rate and less hardware resource occupation.

Embodiments of the disclosure will be described in detail below with reference to the accompanying drawings.

In an embodiment of the disclosure, FIG. 1 is a schematic flowchart of a method for image compensation according to an embodiment of the disclosure. As illustrated in FIG. 1, the method includes the following operations.

In operation S101: a row coordinate and a column coordinate for each of at least one pixel are determined.

It should be noted that the method for image compensation according to the embodiment of the disclosure is applied to an apparatus for image compensation or an electronic device integrated with this apparatus, and the electronic device has a curved screen. For example, smart phones, tablets, laptops, smart watches, etc. Based on the method for image compensation, a certain degree of color compensation is performed for the pixels located in the edge region of the curved screen, which can improve the color deviation phenomenon in the edge region of the curved screen.

It should also be noted that, in the embodiment of the disclosure, the row coordinate of the pixel indicates the row in which the pixel is located in a frame of an image, and the column coordinate of the pixel indicates the column in which the pixel is located in the frame of an image.

It should also be noted that the embodiment of the disclosure may be applied to real-time image/video transmission of at least one channel transmission, especially multi-pixel channel transmission. Specifically, a frame of a picture is transmitted in a row-by-row scanning manner during the image or video transmission. Due to the fast transmission speed, the human eyes cannot distinguish the time intervals, resulting in a continuous and complete picture being presented. The multi-pixel channel transmission (that is, multi-channel transmission) refers to that during the transmission, multiple pixels in a row of pixels are scanned at a time and transmitted in parallel.

Figure 2:
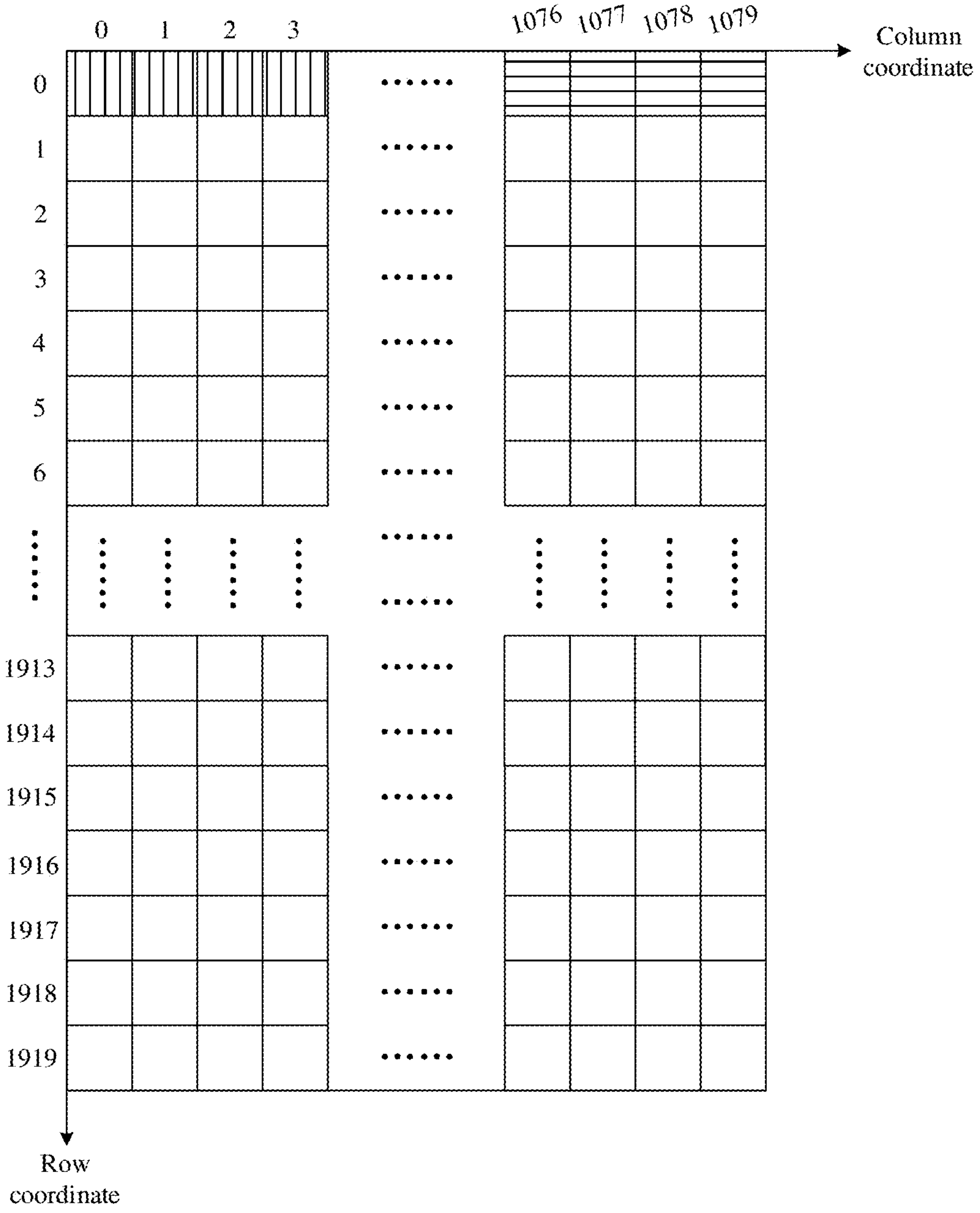
FIG. 2 is a schematic diagram of a pixel distribution of an image according to an embodiment of the disclosure.

For example, FIG. 2 is a schematic diagram of a pixel distribution of an image according to an embodiment of the disclosure. As illustrated in FIG. 2, assuming that the resolution of the image is 1080×1920, that is, 1080 pixels are contained in one row of the image (the row resolution is 1080), and 1920 pixels are contained in one column of the image (the column resolution is 1920). In the embodiments of the disclosure, take an example where the row coordinate and the column coordinate start from 0 and count up by 1. This will not be specifically explained later. It should be understood that if the counting starts from 1 or other numbers, the same implementation principle is also applied.

Assuming that the image is transmitted in parallel with 4 channels, as illustrated in FIG. 2, during the first scan and transmission, since the first 4 pixels of the first row (the 4 pixels filled with vertical lines in FIG. 2) are transmitted, the row coordinates of the 4 pixels are all 0. Since the 4 pixels are transmitted in parallel with 4 channels, the obtained column coordinates of the 4 pixels are 0, 1, 2 and 3 respectively. Similarly, in the second scan and transmission, since the 5th to 8th pixels of the first row are scanned, the row coordinates of the 5th to 8th pixels are still 0. Since the 5th to 8th pixels are transmitted in parallel with 4 channels, the obtained column coordinates of these 4 pixels are 4, 5, 6, 7, respectively, and so this process continues . . . . In the 240th scan and transmission, since the 1077th to 1080th pixels of the first row are scanned, the row coordinates of these 4 pixels are still 0. Since the 1077th to 1080th pixels are transmitted in parallel with 4 channels, the obtained column coordinates of these 4 pixels are 1076, 1077, 1078, and 1079, respectively. At this point, the scanning of the first row of this frame of image is completed, and each subsequent row and each frame of image are scanned and transmitted in the same way.

That is to say, for operation S101, the number of pixels transmitted in parallel with multiple channels is recorded as the first number, that is, the number of at least one pixel is the first number, and the first number of pixels are consecutive pixels in one row of the image (such as the 1st to 4th pixels in the first row).

In some embodiments, the row coordinates and the column coordinates of the pixels may be determined by counting. Accordingly, the operation that the row coordinate and the column coordinate for each of at least one pixel are determined may include the following operations.

A field synchronization signal and a pixel valid signal are received. The field synchronization signal is valid within a scanning time of one frame of an image, and the pixel valid signal is valid within a scanning time of one row of pixels.

The row counting is performed based on the field synchronization signal and the pixel valid signal, and the row coordinate of each pixel is determined. The column counting is performed based on the pixel valid signal, and the column coordinate of each pixel is determined. The first number of pixels have identical row coordinates and different column coordinates.

Figure 3:
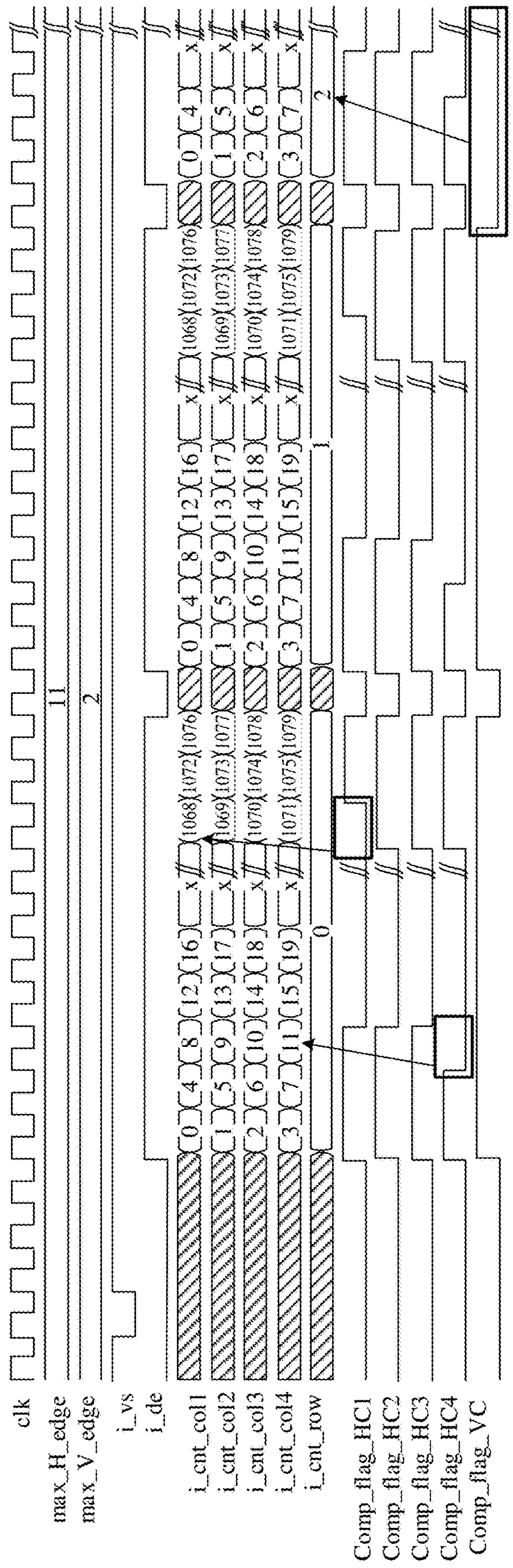
FIG. 3 is a first schematic diagram of a signal timing according to an embodiment of the disclosure.

It should be noted that, referring to FIG. 3, a schematic diagram of a signal timing according to an embodiment of the disclosure is illustrated. Where, i_vs represents the field synchronization signal, i_de represents the pixel valid signal, i_cnt_col1 to i_cnt_col4 represent the four column coordinates in parallel, i_cnt_row represents the row coordinate, and clk is the system clock.

As illustrated in FIG. 3, assuming that both the field synchronization signal i_vs and the pixel valid signal i_de are signals valid at high-level (or recorded as the first level), during the period that the field synchronization signal i_vs is in the high-level state, it indicates that a frame of image is being scanned. Since the actual scanning of the image also involves the edge region of the display screen and the like, the rising edge of the field synchronization signal i_vs precedes the coordinates (the row coordinates, the column coordinates) of the pixels. During the period that the pixel valid signal i_de is in the high-level state, it indicates that a certain row of a frame of image is being scanned. Therefore, when the first rising edge of the pixel valid signal i_de appears during the period that the field synchronization signal i_vs is in the high-level state, the row coordinate i_cnt_row start counting from 0, and when the next rising edge of the pixel valid signal i_de appears, the count of the row coordinate i_cnt_row is incremented by 1. In case that the field synchronization signal i_vs transitions to a low-level state (invalid), it indicates that the scanning of one frame of image is completed, the counting for the row coordinates is cleared. In case that the field synchronization signal i_vs transitions to a high-level state again, the counting for the row coordinates is restarted.

For the column coordinates i_cnt_col1 to i_cnt_col4, during the period that the pixel valid signal i_de is in the valid state, each scan is for 4 pixels. In the first scan, the 4 column coordinates i_cnt_col1 to i_cnt_col4 are 0, 1, 2, and 3 respectively. Based on the 4-channel scanning and transmission manner, the 4 column coordinates i_cnt_col1 to i_cnt_col4 are added by 4 in the next scan, respectively, and thus the 4 column coordinates are respectively 4, 5, 6, and 7. In case that the pixel valid signal i_de transitions to a low-level state (invalid), it indicates that the scanning of one row of pixels is completed, and the counting for the column coordinates is cleared. In case that the pixel valid signal i_de transitions to a high-level state again, the counting for the column coordinate is restarted.

In operation S102: the row coordinate of the pixel is symmetrically mapped to obtain a target row coordinate of the pixel, and the column coordinate of the pixel is symmetrically mapped to obtain a target column coordinate of the pixel.

In operation S103: whether the pixel is located in an edge region of the curved screen is determined.

It should be noted that in the embodiment of the disclosure, there is no strict sequential execution order for operations S102 and S103, and both may be executed simultaneously or one may be executed before the other. The execution order may also be determined based on a specific implementation, which is not specifically limited.

Figure 4:
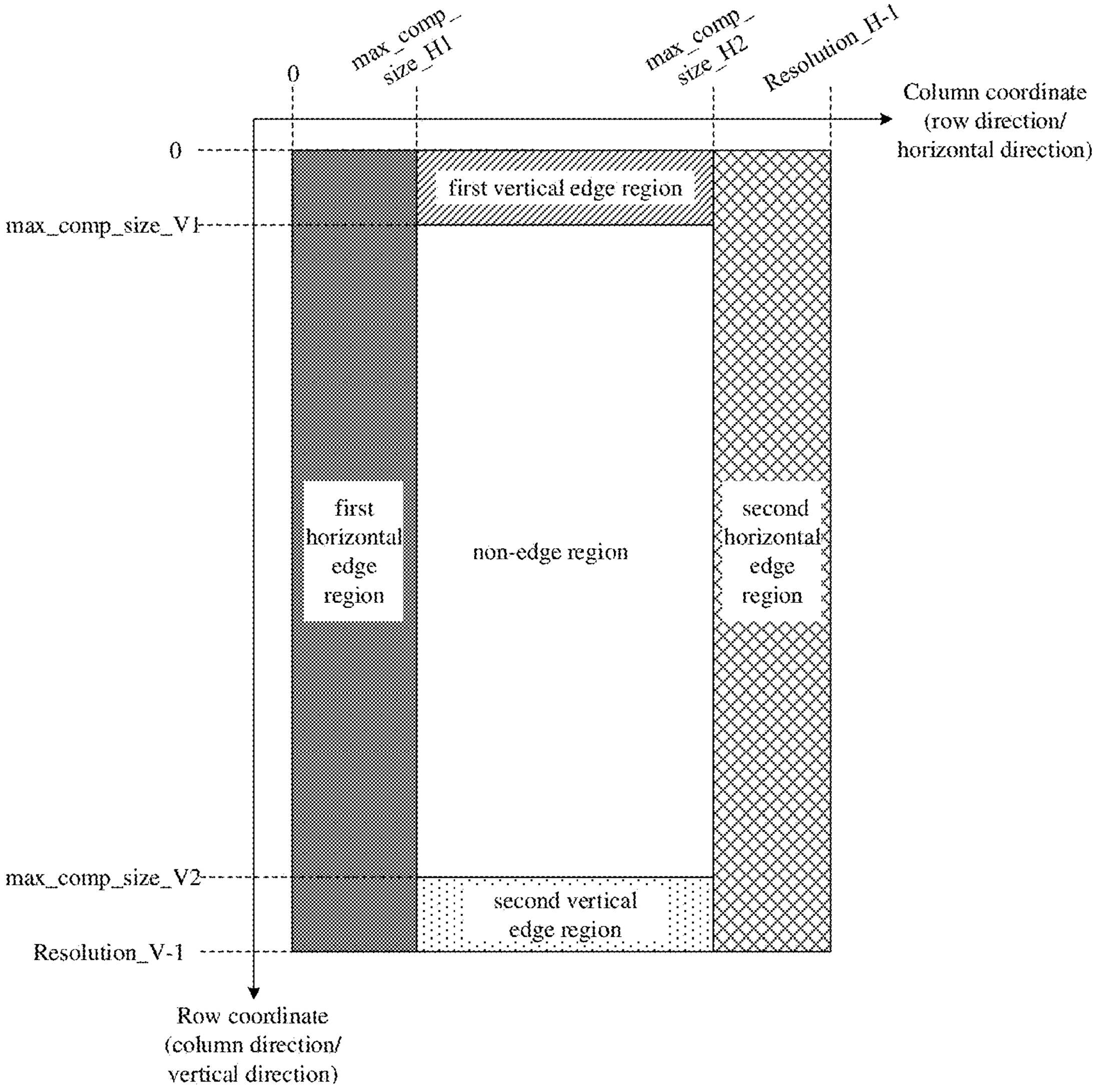
FIG. 4 is a first schematic diagram of a region division of a curved screen according to an embodiment of the disclosure.

It should also be noted that since the curved screen (such as the curved screen of the smart phone) typically has a symmetrical structure, the symmetrical regions may be compensated in the same way. For ease of description, referring to FIG. 4, a first schematic diagram of a region division of a curved screen according to an embodiment of the disclosure is illustrated. As illustrated in FIG. 4, the curved screen is divided into the edge region and the non-edge region. The edge region is a region containing the curved surface, usually located at the edges of the display screen. FIG. 4 illustrates an example where the curved surfaces are all around the display screen.

As illustrated in FIG. 4, the edge region includes a horizontal edge region and a vertical edge region, the horizontal edge region includes a first horizontal edge region and a second horizontal edge region, and the vertical edge region includes a first vertical edge region and a second vertical edge region. The first horizontal edge region and the second horizontal edge region are symmetrically distributed on opposite sides of the curved screen in the row direction, and the first horizontal edge region and the second horizontal edge region extend in the column direction. The first vertical edge region and the second vertical edge region are symmetrically distributed on opposite sides of the curved screen in the column direction, and the first vertical edge region and the second vertical edge region extend in the row direction. In addition, as illustrated in FIG. 4, in an embodiment of the disclosure, the corner region where the horizontal edge region intersects with the vertical edge region is regarded as the horizontal edge region, but the corner region can also be regarded as the vertical edge region, which is related to the actual curving mode of the screen. No specific limitation is imposed here. The corner region will be regarded as a region which is more beneficial for improving the color deviation.

As illustrated in FIG. 4, the row direction is also referred to as the horizontal direction, i.e., the extension direction of a row of pixels, and the row direction is parallel to the column coordinate axis. The column direction is also referred to as the vertical direction, i.e., the extending direction of a column of pixels, and the column direction is parallel to the row coordinate axis. The first horizontal edge region and the second horizontal edge region are symmetrically distributed along a symmetry axis parallel to the column direction, and the first vertical edge region and the second vertical edge region are symmetrically distributed along a symmetry axis parallel to the row direction. The first horizontal edge region and the first vertical edge region are relatively close to the coordinate origin, and the second horizontal edge region and the second vertical edge region are relatively far away from the coordinate origin. Based on the characteristic of this symmetrical distribution, pixels at symmetrical positions in the first horizontal edge region and the second horizontal edge region may be image compensated in the same manner, and pixels at symmetrical positions in the first vertical edge region and the second vertical edge region may be image compensated in the same manner.

For each edge region, the coordinates of its outermost side are basically fixed. For the first vertical edge region, the row coordinate of the outermost side is 0, and the row coordinate of a row of pixels where the first vertical edge region intersects with the non-edge region is the edge row coordinate, which is denoted as the first edge row coordinate max_comp_size_V1. For the second vertical edge region, the row coordinate of the outermost edge is the column resolution minus 1 (Resolution_V−1), and the row coordinate of a row of pixels where the second vertical edge region intersects with the non-edge region is the edge row coordinate, which is denoted as the second edge row coordinate max_comp_size_V2. For the first horizontal edge region, the column coordinate of the outermost side is 0, and the column coordinate of a column of pixels where the first horizontal edge region intersects with the non-edge region is the edge column coordinate, which is denoted as the first edge column coordinate max_comp_size_H1. For the second horizontal edge region, the column coordinate of the outermost side is the row resolution minus 1 (Resolution_H−1), and the column coordinate of a column of pixels where the second horizontal edge region intersects with the non-edge region is the edge column coordinate, which is denoted as the second edge column coordinate max_comp_size_H2.

The first edge row coordinate max_comp_size_V1 corresponds to the boundary between the first vertical edge region and the non-edge region, the second edge row coordinate max_comp_size_V2 corresponds to the boundary between the second vertical edge region and the non-edge region, the first edge column coordinate max_comp_size_H1 corresponds to the boundary between the first horizontal edge region and the non-edge region, and the second edge column coordinate max_comp_size_H2 corresponds to the boundary between the second horizontal edge region and the non-edge region. The coordinates of the boundaries may be specified by the user or determined based on experience as the boundary between the non-edge region where color deviation does not occur and the edge region where color deviation does occur.

Since the edge region is symmetrically distributed, when dividing the edge region and knowing the resolution, only the first edge row coordinate is needed to be known, and the second edge row coordinate can be known through symmetrical mapping. Alternatively, only the second edge row coordinate is needed to be known, and the first edge row coordinate can be known through symmetric mapping. Similarly, only the first edge column coordinate is needed to be known, and the second edge column coordinate can be known through symmetric mapping. Alternatively, only the second edge column coordinate is needed to be known, and the first edge column coordinate can be known through symmetric mapping.

Accordingly, in some embodiments, the method may further include the following operations. The image resolution, the edge row coordinate and the edge column coordinate are obtained. The edge row coordinate corresponds to a boundary between the first vertical edge region or the second vertical edge region and a non-edge region of the curved screen, and the edge column coordinate corresponds to a boundary between the first horizontal edge region or the second horizontal edge region and the non-edge region.

A symmetrical edge row coordinate symmetrical to the edge row coordinate and a symmetrical edge column coordinate symmetrical to the edge column coordinate are determined based on the image resolution, the edge row coordinate, and the edge column coordinate.

It should be noted that the image resolution includes a row resolution and a column resolution, and the obtained edge row coordinate is the first edge row coordinate (then the second edge row coordinate is the symmetrical edge row coordinate) or the second edge row coordinate (then the first edge row coordinate is the symmetrical edge row coordinate). The obtained edge column coordinate is the first edge column coordinate (then the second edge column coordinate is the symmetrical edge column coordinate) or the second edge column coordinate (then the first edge column coordinate is the symmetrical edge column coordinate). These parameters, after being obtained, are used in subsequent symmetric mapping for the pixel and determining whether the pixel is located in the edge region.

For example, the row resolution of the image is Resolution_H, the column resolution of the image is Resolution_V, in case that the first edge row coordinate max_comp_size_V1 is known, the second edge row coordinate max_comp_size_V2 is: Resolution_V-max_comp_size_V1−1. Alternatively, in case that the second edge row coordinate max_comp_size_V2 is known, the first edge row coordinate max_comp_size_V1 is: Resolution_V-max_comp_size_V2−1. The same goes for the edge column coordinate, which will not be repeated here. Mapping based on this manner can also ensure the accuracy of edge determination.

Based on this symmetrical structure, after determining the row coordinate and the column coordinate of the pixel, the row coordinate and the column coordinate are symmetrically mapped based on an embodiment of the disclosure. The row coordinate is mapped to the target row coordinate, and the column coordinate is mapped to the target column coordinate. Therefore, the compensation for the pixels in any horizontal edge region can be realized only by setting or calculating the relevant parameter of the first horizontal edge region or the second horizontal edge region. Similarly, the compensation for the pixels in any vertical edge region can be realized only by setting or calculating the relevant parameter of the first vertical edge region or the second vertical edge region.

In some embodiments, the specific way of symmetrically mapping the coordinate (the row coordinate or the column coordinate) into the target coordinate (the target row coordinate or the target column coordinate) is as follows.

The operation that the column coordinate of the pixel is symmetrically mapped to obtain the target column coordinate of the pixel includes the following operations.

The column coordinate of the pixel is compared with the edge column coordinate and the symmetric edge column coordinate. The column coordinate of the pixel is determined as the target column coordinate in case that a size relationship between the column coordinate of the pixel and the edge column coordinate is a first relationship. The column coordinate symmetrical to the column coordinate of the pixel is determined as the target column coordinate in case that a size relationship between the column coordinate of the pixel and the symmetric edge column coordinate is a second relationship. The first relationship is less than, and the second relationship is greater than. Alternatively, the first relationship is greater than, and the second relationship is less than.

The operation that the row coordinate of the pixel is symmetrically mapped to obtain the target row coordinate of the pixel includes the following operations.

The row coordinate of the pixel is compared with the edge row coordinate and the symmetric edge row coordinate. The row coordinate of the pixel is determined as the target row coordinate in case that a size relationship between the row coordinate of the pixel and the edge row coordinate is the first relationship. The row coordinate symmetrical to the row coordinate is determined as the target row coordinate in case that a size relationship between the row coordinate of the pixel and the symmetrical edge row coordinate is the second relationship.

It should be noted that, for the horizontal edge region, assuming that the first edge column coordinate is known and a column of pixels corresponding to the first edge column coordinate are regarded as pixels in the non-edge region, the first relationship is less than, and the second relationship is greater than. If a column of pixels corresponding to the first edge column coordinate are regarded as pixels in the edge region, the first relationship is less than or equal to, and the second relationship is greater than or equal to. In the following, taking only the previous case as an example, the way of symmetrically mapping (horizontal mapping) the column coordinates is as following formula (1):

$$\text{out\_cnt\_col} = \begin{cases} \text{i\_cnt\_col}, & \text{i\_cnt\_col} < \text{max\_comp\_size\_H1} \\ \text{Resolution\_H} - \text{i\_cnt\_col} - 1, & \text{i\_cnt\_col} > \text{Resolution\_H} - \text{max\_comp\_size\_H1} - 1 \end{cases} \quad \text{Formula (1)}$$

where, out_cnt_col represents the target column coordinate, i_cnt_col represents the column coordinate, max_comp_size_H1 represents the first edge column coordinate, and Resolution_H represents the row resolution (or the horizontal resolution). As can be seen, the first edge column coordinate max_comp_size_H1 is horizontally mapped to obtain the second edge column coordinate max_comp_size_H2: Resolution_H-max_comp_size_H1−1. In this way, by comparing the column coordinate of the pixel and the two edge column coordinates respectively, which region the pixel is located in can be determined, and the column coordinates located in the second horizontal edge region are horizontally mapped to the first horizontal edge region.

In combination with FIG. 4 and formula (1), if the column coordinate i_cnt_col of the pixel is less than or equal to the first edge column coordinate max_comp_size_H1, it indicates that the pixel is located in the first horizontal edge region, and the coordinate conversion is not performed on this pixel. If the column coordinate i_cnt_col of the pixel is larger than the second edge column coordinate (Resolution_H-max_comp_size_H1−1), it indicates that the column coordinate is located in the second horizontal edge region, and the column coordinate is symmetrically mapped into the first horizontal edge region, that is, the symmetrical column coordinate, in the first horizontal edge region, of the column coordinate is taken as the target column coordinate.

Figure 5:
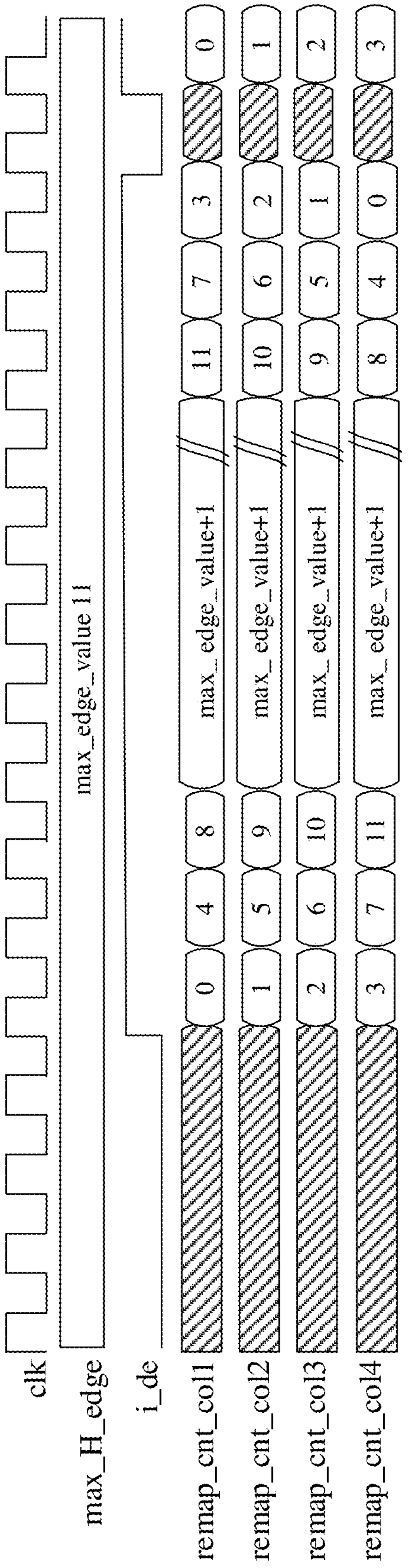
FIG. 5 is a second schematic diagram of a signal timing according to an embodiment of the disclosure.

Based on the aforementioned timing illustrated in FIG. 3, FIG. 5 is a schematic diagram of another timing according to an embodiment of the disclosure. As illustrated in FIG. 5, clk is the system clock, max_H_edge is the signal indicating the first horizontal edge coordinate (in this example, the value of the first horizontal edge coordinate is: max_edge_value=11); remap_cnt_col1 to remap_cnt_col4 respectively represent 4 target column coordinates obtained in parallel. During the period that the pixel valid signal i_de is in the high-level, for the column coordinate less than or equal to 11, the target column coordinate is equal to the original column coordinate; and for the column coordinates greater than or equal to 1068 (1080−11−1), the target column coordinate is equal to the symmetric coordinate (1080−the column coordinate−1) of the original column coordinate.

Thus, through symmetrical mapping, the column coordinates in FIG. 3 are mapped to the target column coordinates illustrated in FIG. 5. In addition, the column coordinates in the non-edge region may not be processed. Alternatively, as illustrated in FIG. 5, the column coordinates in the non-edge region may be considered as: the value of the first edge column coordinate+1; the same goes for the row coordinate, which are not specifically limited.

Similarly, assuming that the second edge column coordinate is known and a column of pixels corresponding to the second edge column coordinate are regarded as pixels in the non-edge region, the first relationship is greater than, and the second relationship is less than. If a column of pixels corresponding to the second edge column coordinate are regarded as pixels in the edge region, the first relationship is greater than or equal to, and the second relationship is less than or equal to. In the following, taking only the previous case as an example, the way of symmetrically mapping (horizontal mapping) the column coordinates is as following formula (2):

$$\text{out\_cnt\_col} = \begin{cases} \text{i\_cnt\_col}, & \text{i\_cnt\_col} > \text{max\_comp\_size\_H2} \\ \text{Resolution\_H} - \text{i\_cnt\_col} - 1, & \text{i\_cnt\_col} < \text{Resolution\_H} - \text{max\_comp\_size\_H2} - 1 \end{cases} \quad \text{Formula (2)}$$

where, max_comp_size_H2 represents the second edge column coordinate. As can be seen, the second edge column coordinate max_comp_size_H2 is horizontally mapped to obtain the first edge column coordinate max_comp_size_H1: Resolution_H-max_comp_size_H2−1. In this way, by comparing the column coordinate of the pixel and the two edge column coordinates respectively, which region the pixel is located in can be determined, and the column coordinates located in the first horizontal edge region are horizontally mapped to the second horizontal edge region, which will not be repeated here.

Similarly, for the vertical edge region, assuming that the first edge row coordinate is known and a row of pixels corresponding to the first edge row coordinate are regarded as pixels in the non-edge region, the first relationship is less than, and the second relationship is greater than. If a row of pixels corresponding to the first edge row coordinate are regarded as pixels in the edge region, the first relationship is less than or equal to, and the second relationship is greater than or equal to. In the following, taking only the previous case as an example, the way of symmetrically mapping (vertical mapping) the row coordinate is as following formula (3):

$$out\_cnt\_row = \begin{cases} i\_cnt\_row, & i\_cnt\_row < max\_comp\_size\_V1 \\ Resolution\_v - & i\_cnt\_row > Resolution\_V - \\ i\_cnt\_row - 1, & max\_comp\_size\_V1 - 1 \end{cases} \quad \text{Formula (3)}$$

where, out_cnt_row represents the target row coordinate, i_cnt_row represents the row coordinate, max_comp_size_V1 represents the first edge row coordinate, and Resolution_V represents the column resolution (or the vertical resolution). As can be seen, the first edge row coordinate max_comp_size_V1 is vertically mapped to obtain the second edge row coordinate max_comp_size_V2: Resolution_V-max_comp_size_V1−1. In this way, by comparing the row coordinate of the pixel and the two edge row coordinates respectively, which region the pixel is located in can be determined, and the row coordinates located in the second vertical edge region are vertically mapped to the first vertical edge region.

In combination with FIG. 4 and formula (3), if the row coordinate i_cnt_row of the pixel is less than or equal to the first edge row coordinate max_comp_size_V1, it indicates that the pixel is located in the first vertical edge region, and the coordinate conversion is not performed on this pixel. If the row coordinate i_cnt_row of the pixel is larger than the second edge row coordinate (Resolution_V-max_comp_size_V1−1), it indicates that the row coordinate is located in the second vertical edge region, and this row coordinate is symmetrically mapped into the first vertical edge region, that is, the symmetrical row coordinate, in the first vertical edge region, of the row coordinate is taken as the target row coordinate.

Similarly, assuming that the second edge row coordinate is known and a row of pixels corresponding to the second edge row coordinate are regarded as pixels in the non-edge region, the first relationship is greater than, and the second relationship is less than. If a row of pixels corresponding to the second edge row coordinate are regarded as pixels in the edge region, the first relationship is greater than or equal to, and the second relationship is less than or equal to. In the following, taking only the previous case as an example, the way of symmetrically mapping (vertical mapping) the row coordinate is as following formula (4):

$$out\_cnt\_row = \begin{cases} i\_cnt\_row, & i\_cnt\_row > max\_comp\_size\_V2 \\ Resolution\_H - & i\_cnt\_row < Resolution\_V - \\ i\_cnt\_row - 1, & max\_comp\_size\_V2 - 1 \end{cases} \quad \text{Formula (4)}$$

where, max_comp_size_V2 represents the second edge row coordinate. As can be seen, the second edge row coordinate max_comp_size_V2 is vertically mapped to obtain the first edge row coordinate max_comp_size_V1: Resolution_V-max_comp_size_V2−1. In this way, by comparing the row coordinate of the pixel and the two edge row coordinates respectively, which region the pixel is located in can be determined, and the row coordinates located in the first vertical edge region are vertically mapped to the second vertical edge region. It will not be repeated here.

It is to be understood that if each coordinate is counted from 1, there is no need to subtract by 1 when performing symmetric mapping.

Furthermore, the pixels in the non-edge region typically do not exist color deviation phenomenon, and thus, only the pixels in the edge region are compensated based on embodiments of the disclosure. For operation S103, in some embodiments, the operation of determining whether the pixel is located in the edge region of the curved screen may include the following operations.

Whether the pixel is located in the edge region is determined based on the image resolution, the edge row coordinate, the edge column coordinate, and the row coordinate and the column coordinate of the pixel. Alternatively, whether the pixel is located in the edge region is determined based on the image resolution, the edge row coordinate, the edge column coordinate, and the target row coordinate and the target column coordinate of the pixel.

It should be noted that, taking the obtaining the first edge row coordinate and the first edge column coordinate as an example, in an embodiment of the disclosure, the symmetrical mapping may be performed based on the first edge row coordinate and the first edge column coordinate, to determine the second edge row coordinate and the second edge column coordinate, so that each horizontal edge region and vertical edge region can be defined. And then, the row coordinate is compared with the first edge row coordinate and the second edge row coordinate, and in case that the row coordinate is less than the first edge row coordinate, it is determined that the pixel is located in the first vertical edge region; and in case that the row coordinate is larger than the second edge row coordinate, it is determined that the pixel is located in the second vertical edge region. The same goes for the determination of the column coordinate, which will not be repeated here. In addition, as an example, if a pixel satisfies being located in both the horizontal edge region and the vertical edge region, it is determined that the pixel is located in the horizontal edge region.

Alternatively, based on an embodiment of the disclosure, the first edge row coordinate and the first edge column coordinate may not be symmetrically mapped, and whether the pixel is located in the edge region is determined based on the target row coordinate and the target column coordinate obtained through the above symmetrical mapping. In case that the target row coordinate is less than the first edge row coordinate, it is determined that the pixel is located in the vertical edge region; and in case that the target column coordinate is less than the first edge column coordinate, it is determined that the pixel is located in the horizontal edge region.

In operation S104: in case that the pixel is located in the edge region, a compensation coefficient of the pixel is determined based on the target row coordinate of the pixel or the target column coordinate of the pixel.

It should be noted that, although the pixels in the edge region (for example, the pixels in the first horizontal edge region) are all in the same region, the degrees of color deviation exhibited are different due to the different degrees of curvature of the curved surface or the like. Therefore, after determining that the pixel is located in the edge region, the compensation coefficient (also referred to as a gain compensation coefficient, a compensation gain coefficient, a gain coefficient, a gain compensation value, a compensation gain value, etc.) of the pixel is calculated based on the target coordinate (the target row coordinate or the target column coordinate) of the pixel based on an embodiment of the disclosure, to ensure that the degree of compensation conforms to the compensation demand of the position where the pixel is located.

It should also be noted that in the above-described operations, the row coordinate and the column coordinate of the pixel are symmetrically mapped, so that the same compensation coefficient is used for pixels that are symmetrical in the horizontal direction or the vertical direction. That is, the calculation only needs to be performed based on the target row coordinate or the target column coordinate obtained through the mapping. For pixels in the vertical edge region, the compensation coefficient is determined based on the target row coordinate thereof; and for pixels in the horizontal edge region, the compensation coefficient is determined based on the target column coordinate thereof.

In some embodiments, the method further includes the following operations.

Multiple sub-edge column coordinates, compensation coefficients corresponding to the multiple sub-edge column coordinates, multiple sub-edge row coordinates and compensation coefficients corresponding to the multiple sub-edge row coordinates are obtained. The multiple sub-edge column coordinates divide a target horizontal edge region into the second number of sub-horizontal edge regions, and the target horizontal edge region is the first horizontal edge region or the second horizontal edge region. The multiple sub-edge row coordinates divide a target vertical edge region into the third number of sub-vertical edge regions, and the target vertical edge region is the first vertical edge region or the second vertical edge region.

Figure 6:
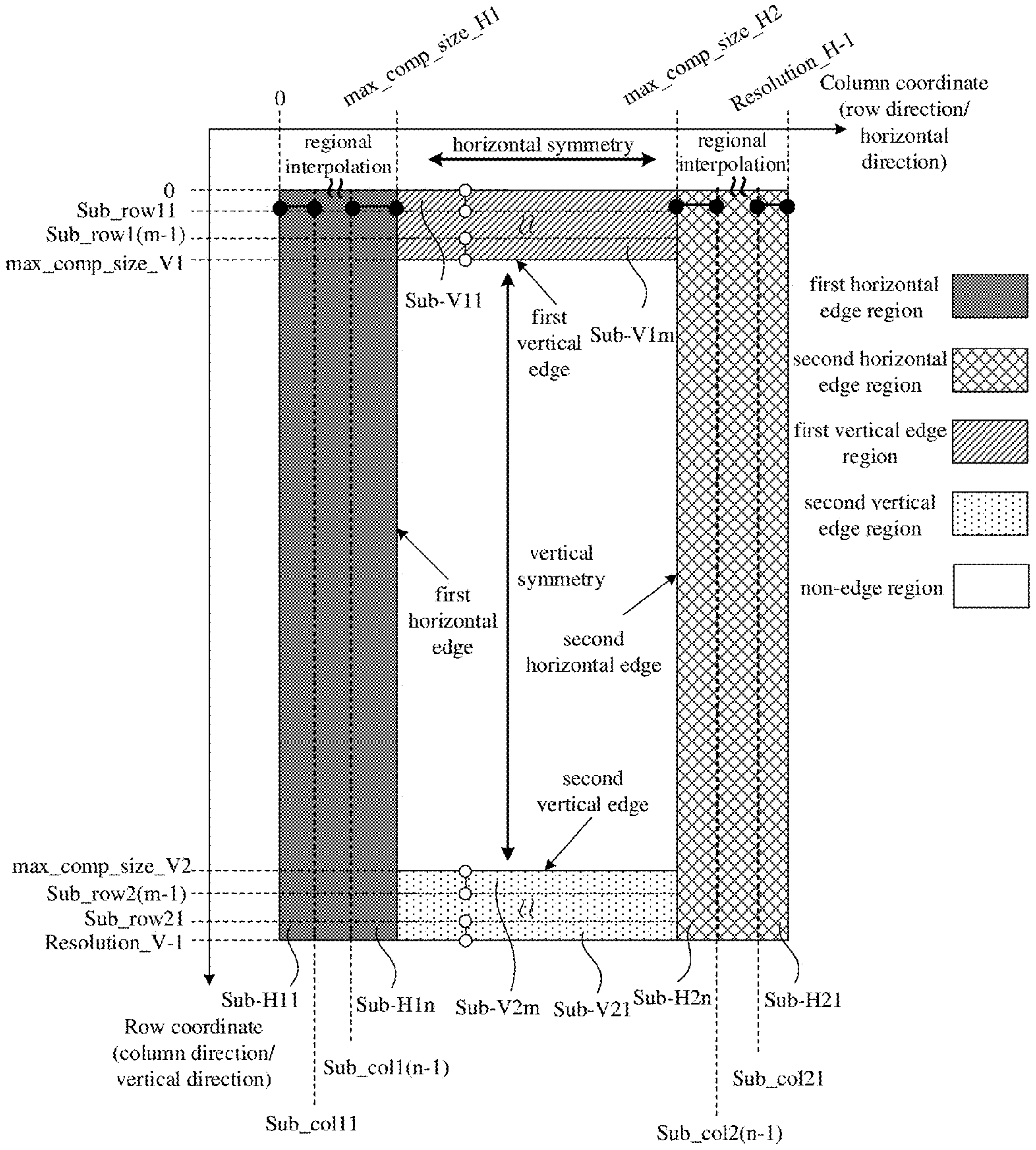
FIG. 6 is a second schematic diagram of a region division of a curved screen according to an embodiment of the disclosure.

It should be noted that, FIG. 6 is a second schematic diagram of a region division of a curved screen according to an embodiment of the disclosure. As illustrated in FIG. 6, take an example where the second number is n and the third number is m, n and m are both integers greater than 0, and n and m may be the same or different.

For the horizontal edge region, as illustrated in FIG. 6, assuming that the target horizontal edge region is the first horizontal edge region, the obtained sub-edge column coordinates may be n+1, which are 0, Sub_col11, Sub_col1 2, . . . , Sub_col1(n−1), and max_comp_size_H1. These sub-edge column coordinates divide the first horizontal edge region into n sub-horizontal edge regions, which are sub-horizontal edge region Sub-H11, sub-horizontal edge region Sub-H12, . . . , and sub-horizontal edge region Sub-H1n, respectively. At the same time, the compensation coefficient corresponding to each sub-edge column coordinate is obtained.

Assuming that the target horizontal edge region is the second horizontal edge region, the obtained sub-edge column coordinates may also be n+1, which are Resolution_H−1, Sub_col21, Sub_col22, . . . , Sub_col2(n−1), and max_comp_size_H2. These sub-edge column coordinates divide the second horizontal edge region into n sub-horizontal edge regions, which are sub-horizontal edge region Sub-H21, sub-horizontal edge region Sub-H22, . . . , and sub-horizontal edge region Sub-H2n, respectively. At the same time, the compensation coefficient corresponding to each sub-edge column coordinate is also obtained.

Since the second horizontal edge region is symmetrical to the first horizontal edge region, the sub-edge column coordinates (Resolution_H−1, Sub_col21, Sub_col22, . . . , Sub_col2(n−1), max_comp_size_H2) of the second horizontal edge region are symmetric mappings to the sub-edge column coordinates (0, Sub_col11, Sub_col12, . . . , Sub_col1(n−1), and max_comp_size_H1) of the first horizontal edge region, respectively. Moreover, the sub-horizontal edge region Sub-H21 is a symmetric mapping to the sub-horizontal edge region Sub-H11, . . . , and sub-horizontal edge region Sub-H1n is a symmetric mapping to the sub-horizontal edge region Sub-H2n.

For the vertical edge region, as illustrated in FIG. 6, assuming that the target vertical edge region is the first vertical edge region, the obtained sub-edge row coordinate may be m+1, which are 0, Sub_row11, Sub_row12, . . . , Sub_row1(m−1), and max_comp_size_V1. These sub-edge row coordinates divide the first vertical edge region into m sub-vertical edge regions, which are sub-vertical edge region Sub-V11, sub-vertical edge region Sub-V12, . . . , and sub-vertical edge region Sub-V1m, respectively. At the same time, the compensation coefficient corresponding to each sub-edge row coordinate is also obtained.

Assuming that the target vertical edge region is the second vertical edge region, the obtained sub-edge row coordinate may also be m+1, which are Resolution_V−1, Sub_row21, Sub_row22, . . . , Sub_row2(m−1), and max_comp_size_V2. These sub-edge row coordinates divide the second vertical edge region into m sub-vertical edge regions, which are sub-vertical edge region Sub-V21, sub-vertical edge region Sub-V22, . . . , and sub-vertical edge region Sub-V2m, respectively. At the same time, the compensation coefficient corresponding to each sub-edge row coordinate is also obtained.

Since the second vertical edge region is symmetrical to the first vertical edge region, the sub-edge row coordinates (Resolution_V−1, Sub_row21, Sub_row22, . . . , Sub_row2(m−1), max_comp_size_V2) of the second vertical edge region are symmetric mappings to the sub-edge row coordinates (0, Sub_row11, Sub_row12, . . . , Sub_row1(m−1), and max_comp_size_V1) of the first vertical edge region, respectively. Moreover, the sub-vertical edge region Sub-V21 is a symmetric mapping to the sub-vertical edge region Sub-V11, . . . , and sub-vertical edge region Sub-V2m is a symmetric mapping to the sub-vertical edge region Sub-V1m.

On this basis, the operation of determining the compensation coefficient of the pixel based on the target row coordinate of the pixel or the target column coordinate of the pixel may include the following operations.

A sub-edge region corresponding to the pixel is determined based on the target coordinate. The target coordinate is the target row coordinate or the target column coordinate, and the sub-edge region is the sub-horizontal edge region or the sub-vertical edge region.

The compensation coefficient of the pixel is determined based on the sub-edge coordinate of the sub-edge region corresponding to the pixel, the compensation coefficient corresponding to the sub-edge coordinate and the target coordinate of the pixel. The sub-edge coordinate is the sub-edge row coordinate or the sub-edge column coordinate.

For each of pixels in the horizontal edge region, after converting the column coordinate of the pixel into the target column coordinate, it is only necessary to compare the target column coordinate with each sub-edge column coordinate. In case that the target column coordinate falls into a certain sub-horizontal edge region (i.e., the target column coordinate is between two sub-edge column coordinates), it indicates that the pixel is located in the sub-horizontal edge region, or the pixel after symmetrical mapping falls into the sub-horizontal edge region. At this time, it is only necessary to calculate based on the target column coordinate, the two sub-edge column coordinates of the sub-horizontal edge region, and the compensation coefficients corresponding to two sub-edge column coordinates, to determine the compensation coefficient of the pixel. The calculation method may be linear interpolation.

Similarly, for each of pixels in the vertical edge region, after converting the row coordinate of the pixel into the target row coordinate, it is only necessary to compare the target row coordinate with each sub-edge row coordinate. In case that the target row coordinate falls into a certain sub-vertical edge region, it indicates that the pixel is located in the sub-vertical edge region, or the pixel after symmetrical mapping falls into the sub-vertical edge region. At this time, it is only necessary to calculate based on the target row coordinate, two sub-edge row coordinates of the sub-vertical edge region, and the compensation coefficients corresponding to two sub-edge row coordinates, to determine the compensation coefficient of the pixel. The calculation method may be linear interpolation.

It is to be understood that if the target coordinate coincides with the sub-edge coordinate, the compensation coefficient corresponding to the sub-edge coordinate may be directly determined as the compensation coefficient of the pixel corresponding to the target coordinate. For pixels located in the non-edge region, the compensation coefficients of which can be considered as 1.

Furthermore, in some embodiments, the compensation coefficient includes sub-compensation coefficients corresponding to the fourth number of color components. The operation of determining the compensation coefficient of the pixel based on the sub-edge coordinate of the sub-edge region corresponding to the pixel, the compensation coefficient corresponding to the sub-edge coordinate and the target coordinate of the pixel, includes the following operations.

For each color component, the linear interpolation calculation is performed based on the sub-edge coordinate of the sub-edge region, a sub-compensation coefficient corresponding to the sub-edge coordinate, and the target coordinate of the pixel, to determine a respective sub-compensation coefficient for each color component of the pixel. For pixels located in the non-edge region, the sub-compensation coefficient thereof can be considered as 1.

It should be noted that, for example, in the RGB color mode, the actual color of the pixel is a superposition of three color components of Red (R), Green (G), and Blue (B). The pixel value of each color component may vary between 0 and 255. For any one of color components, the corresponding sub-compensation coefficient can be calculated. Similarly, when obtaining the compensation coefficient corresponding to each sub-edge coordinate as described above, the obtained coefficients are respective sub-compensation coefficients for each color component. For each color component, the sub-compensation coefficient thereof can be calculated based on the following formula (5):

$$\text{comp\_gain} = \frac{\text{gain}_2 - \text{gain}_1}{Co_2 - Co_1} \times (\text{out\_cnt} - Co_1) + \text{gain}_1 \qquad \text{Formula (5)}$$

where, the comp_gain represents a sub-compensation coefficient for the target color component of the pixel with the target coordinate out_cnt, the target coordinate is the target row coordinate or the target column coordinate, and the target color component is any one of the fourth number of color components. $Co_1$ and $Co_2$ are the two sub-edge coordinates of the sub-edge region corresponding to the pixel, respectively; $\text{gain}_1$ is the sub-compensation coefficient corresponding to the target color component at the edge coordinate $Co_1$, and $\text{gain}_2$ is the sub-compensation coefficient corresponding to the target color component at the edge coordinate $Co_2$. In addition, since the result of the multiplication operation in formula (5) can be expressed as an absolute value, so there is no need to distinguish the size relationship between the values.

Specifically, for the horizontal edge region, the following formula (6) is used to calculate a compensation coefficient for a target color component of a pixel in the horizontal edge region:

$$\text{H\_comp\_gain} = \frac{\text{H\_gain}_2 - \text{H\_gain}_1}{Col_2 - Col_1} \times (\text{out\_cnt\_col} - Col_1) + \text{H\_gain}_1 \qquad \text{Formula (6)}$$

where H_comp_gain represents a sub-compensation coefficient for the target color component of the pixel with the target column coordinate out_cnt_col. $\text{Col}_1$ and $\text{Col}_2$ are the two sub-edge column coordinates of the sub-horizontal edge region corresponding to the pixel, respectively; $\text{H\_gain}_1$ is the sub-compensation coefficient corresponding to the target color component at the edge column coordinate $\text{Col}_1$, and $\text{H\_gain}_2$ is the sub-compensation coefficient corresponding to the target color component at the edge column coordinate $\text{Col}_2$. In addition, since the result of the multiplication operation in formula (6) can be expressed as an absolute value, so there is no need to distinguish the size relationship between the values.

For the vertical edge region, the following formula (7) is used to calculate a compensation coefficient for a target color component of a pixel in the vertical edge region:

$$\text{V\_comp\_gain} = \frac{\text{V\_gain}_2 - \text{V\_gain}_1}{\text{Row}_2 - \text{Row}_1} \times (\text{out\_cnt\_row} - \text{Row}_1) + \text{V\_gain}_1 \qquad \text{Formula (7)}$$

where V_comp_gain represents a sub-compensation coefficient for the target color component of the pixel with the target row coordinate out_cnt_row. $\text{Row}_1$ and $\text{Row}_2$ are the two sub-edge row coordinates of the sub-vertical edge region corresponding to the pixel, respectively; $\text{V\_gain}_1$ is the sub-compensation coefficient corresponding to the target color component at the edge row coordinate $\text{Row}_1$, and $\text{V\_gain}_2$ is the sub-compensation coefficient corresponding to the target color component at the edge row coordinate $\text{Row}_2$. In addition, since the result of the multiplication operation in formula (7) can be expressed as an absolute value, so there is no need to distinguish the size relationship between the values.

In operation S105: a target pixel value of the pixel is determined based on the compensation coefficient of the pixel and original pixel value of the pixel.

It should be noted that, after the sub-compensation coefficient is determined, the sub-compensation coefficient is multiplied by the original pixel value of the color component, to obtain the target pixel value of the color. In addition, for the RGB pixel mode, if the pixel value is greater than 255 after multiplication, scaling the target pixel value can also be performed to ensure accuracy of the color representation.

Furthermore, in practice, there may be a certain color component where there is no color deviation, and then compensation for the color component is not necessary. Therefore, in some embodiments, the operation of determining the target pixel value of the pixel based on the compensation coefficient of the pixel and the original pixel value of the pixel includes the following operations.

An original pixel value of a pixel is obtained.

A compensation mode is determined.

A normalization operation is performed on the compensation coefficient for each of the color components of the pixel based on the compensation mode.

A weighting calculation is performed on the original pixel value of the pixel based on the sub-compensation coefficient for each of the color components after the normalization operation, to obtain the target pixel value of the pixel.

It should be noted that if there is no color deviation in a certain color component or a degree of color deviation is light, the sub-compensation coefficient of the color component may be set to 1 based on the compensation mode, and then the sub-compensation coefficients of other color components may be processed in equal proportion. Alternatively, the sub-compensation coefficient of a certain color component is set to 1 based on the compensation mode, and the sub-compensation coefficients of other color components are set to sub-compensation coefficients obtained through the linear interpolation calculation as described above.

Finally, the original pixel value of each of the color components of the pixel located in the edge region is multiplied with the sub-compensation coefficient corresponding to the color component, to obtain the target pixel value as output. The pixel located in the non-edge region maintains the original pixel value as output, so that the color deviation phenomenon of the final output image is improved.

For example: the compensation mode is as follows:

a. The compensation gain coefficient of the R color component is set to 1, and the compensation gain coefficients of the G and B color components are the compensation gain coefficient 1 and the compensation gain coefficient 2 obtained by the symmetric gain interpolation calculation module 202, respectively.

b. The compensation gain coefficient of the G color component is set to 1, and the compensation gain coefficients of the R and B color components are the compensation gain coefficient 1 and the compensation gain coefficient 2 obtained by the symmetric gain interpolation calculation module 202, respectively.

c. The compensation gain coefficient of the B color component is set to 1, and the compensation gain coefficients of the R and G color components are the compensation gain coefficient 1 and the compensation gain coefficient 2 obtained by the symmetric gain interpolation calculation module 202, respectively.

Finally, the original pixel values of RGB located in the edge region are multiplied by the corresponding compensation gain coefficient, to obtain the target pixel value and output the image; while the pixel not located in the edge region maintains the original pixel value as output. The compensation logic is as follows: for the edge region, the target pixel value is calculated by using the following formulas (8) to (10):

$$R_{out}=R_{initial}\times R_{H\_gain}\text{ or }R_{initial}\times R_{V\_gain}\qquad\text{Formula (8)}$$

$$G_{out}=G_{initial}\times G_{H\_gain}\text{ or }G_{initial}\times G_{V\_gain}\qquad\text{Formula (9)}$$

$$B_{out}=B_{initial}\times B_{H\_gain}\text{ or }B_{initial}\times B_{V\_gain}\qquad\text{Formula (10)}$$

where, in formula (8), $R_{out}$ is the target pixel value of the red component; $R_{initial}$ is the original pixel value of the red component; $R_{H\_gain}$ is the compensation coefficient of the red component in the horizontal direction (calculated by using the target column coordinate); $R_{V\_gain}$ is the compensation coefficient of the red component in the vertical direction (calculated by using the target row coordinate). Formulas (9) and (10) are the related parameters of the green component and the blue component, respectively, which will not be repeated here.

In case that the horizontal edge compensation and the vertical edge compensation are enabled at the same time, the sub-compensation coefficient of the horizontal edge is used for the pixel portion where the edges intersect. In other words, in the embodiment of the disclosure, the method for image compensation may also include the following operations.

The compensation region that is enabled is determined. The compensation region is a horizontal edge region and/or a vertical edge region.

Based on the above-described manner, the compensation process is performed on the compensation region that is enabled.

For the non-edge region, the output pixel value is the original pixel value of the color component, as described in formulas (11) to (13) below:

$$R_{out}=R_{initial}\qquad\text{Formula (11)}$$

$$G_{out}=G_{initial}\qquad\text{Formula (12)}$$

$$B_{out}=B_{initial}\qquad\text{Formula (13)}$$

Furthermore, due to the time required for calculating the compensation coefficients, performing symmetric mapping, etc., in order to ensure that the timing of the original pixel value is aligned with the timing of the sub-compensation coefficient, to obtain the correct target pixel value, in some embodiments, the method may further include the following operations.

A compensation flag that is valid is generated in case that the pixel is located in the edge region.

The compensation flag and the original pixel value are delayed respectively, to enable a timing of the compensation flag being consistent with a timing of the original pixel value.

In case that the delayed compensation flag is valid, a target image is generated based on the target pixel values; and in case that the delayed compensation flag is invalid, the target image is generated based on the original pixel values.

It should be noted that, since the coordinates collected at the same time include row coordinates and multi-channel column coordinates, the compensation flag also includes a row compensation flag (also referred to as a horizontal compensation flag) and multiple column compensation flags (also referred to as vertical compensation flags). As illustrated in FIG. 3, the signal corresponding to the first edge column coordinate is max_H_edge with a value of 11, and the signal corresponding to the first edge row coordinate is max_V_edge with a value of 2. The row compensation flag is Com_flag_VC, and Com_flag_HC1 to Com_flag_HC4 are column compensation flags of four channels, respectively.

Assuming that each compensation flag is valid at a high level, as illustrated in FIG. 3, when the row coordinate i_cnt_row is 0 and 1, both of them are less than 2, so the row compensation flag Com_flag_VC is valid during the period when the row coordinate i_cnt_row is 0 and 1. Similarly, when each column coordinate i_cnt_col is within 11, the corresponding column compensation flag is valid.

Figure 7:
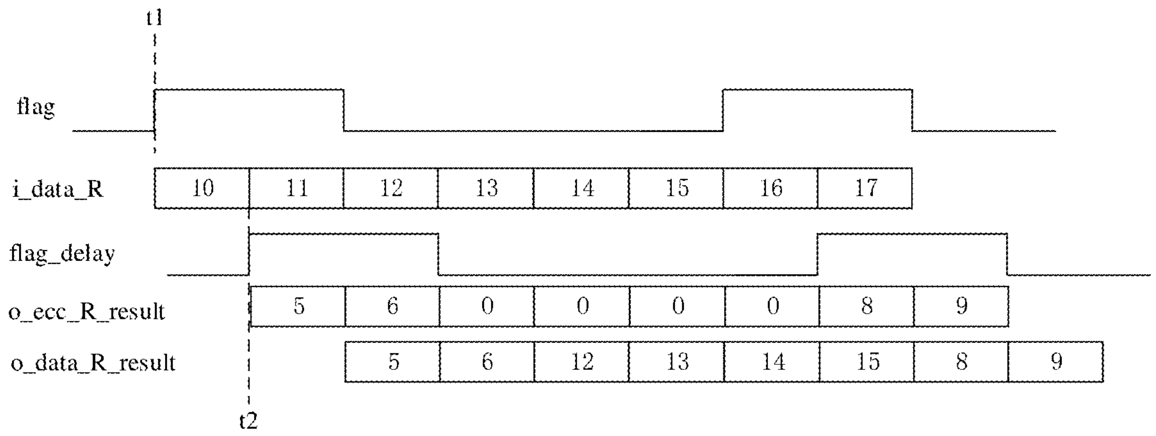
FIG. 7 is a third schematic diagram of a signal timing according to an embodiment of the disclosure.

Based on FIG. 3, FIG. 7 is a schematic timing diagram of delaying each signal. As illustrated in FIG. 7, taking the red component as an example, the flag represents a certain compensation flag; i_data_R represents the original pixel value of the red component, which has been delayed to align with the start (at t1 time, corresponding to the rising edge) of the compensation flag "flag" that is valid; flag_delay represents the delayed compensation flag, o_ecc_R_result represents the target pixel value of the red component calculated by using the sub-compensation coefficient. As illustrated in FIG. 7, the delayed compensation flag flag_delay is aligned with the delayed target pixel value o_ecc_R_result of the red component (at time t2), and then the target pixel value o_ecc_R_result is output during the period that the compensation flag flag_delay is valid, and the final output is denoted as o_data_R_result. During the period that the compensation flag flag_delay is invalid (at a low level), the original pixel value of the red component is output.

Here, due to the limitation of the actual circuit, in some circuits, when calculating the target pixel value, the sub-compensation coefficient should theoretically be set to 1 during the period that no compensation is required. However, in actual calculation, individual sub-compensation coefficients may be decimals, for example, when represented by a 13-bit fixed-point decimal, the sub-compensation coefficient of 1 actually is: $8191/2^{13}\approx 1$, which results in an error. At the same time, considering power consumption, in practice, the portion that does not require compensation can be set to be multiplied by 0, and the original pixel value can be selected for output at the final output.

In summary, due to the inherent optical structural characteristics of the curved screen, a slight color deviation phenomenon will appear when viewing the edge of the curved screen from different angles. Therefore, in the embodiments of the disclosure, the color compensation is performed on the edge portion of the curved screen. Based on the characteristics of symmetrical curved structure of the edge of the curved screen, the horizontal edge portion and the vertical edge portion are typically color compensated in symmetrical form. At the same time, considering the influence of curvature changes on the screen color deviation and the resources occupation during the algorithm hardware design, the representative RGB pixel compensation points (in the edge region) are selected on the horizontal edge and the vertical edge; the RGB pixel compensation coefficients of the compensation points are respectively measured by the software side; the corresponding compensation gain values for the remaining edges are obtained through linear interpolation, and pixels at these positions are weighted and compensated. Considering that in real-time video image processing, in order to improve the image processing rate, multi-channel parallel row-by-row transmission manner for RGB image is typically adopted, where multiple RGB pixels are controlled correspondingly under each pixel clock. However, when performing symmetry compensation for the horizontal edge and the vertical edge, the image edge positions collected by the software side is affected by the multi-channel image transmission manner, and then the pixel positions of the compensation edge needs to be repositioned during the hardware design. Therefore, in order to accurately divide the edges of video image and perform the real-time compensation on the screen, an edge compensation technology for multi-channel video image is proposed in the embodiments of the disclosure. After the original multi-channel video image data is processed as described above, the real-time edge compensation image results are finally output, and when presented on the screen, these results can address the problems of the color deviation at the edge of the curved screen. The compensation edge size and the compensation mode can be customized by the user, which can meet the real-time processing rate and less hardware resource occupation at the same time.

Figure 8:
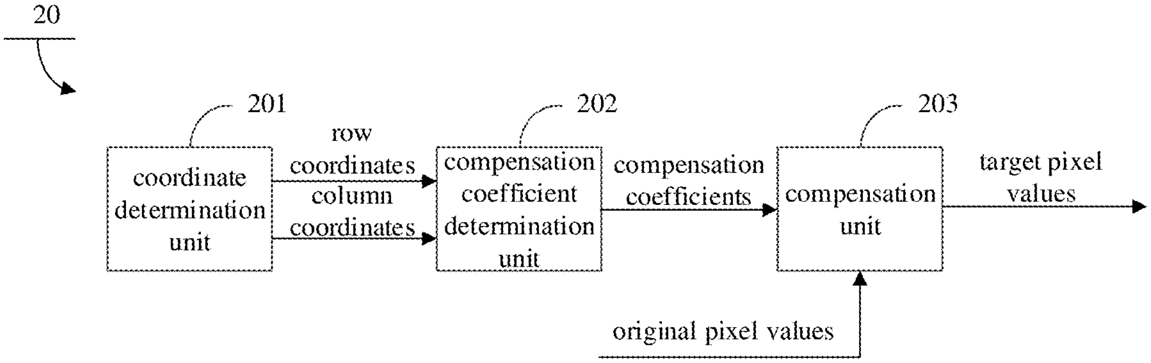
FIG. 8 is a first schematic diagram of the compositional structure of an apparatus for image compensation according to an embodiment of the disclosure.

In another embodiment of the disclosure, FIG. 8 is a schematic diagram of the compositional structure of an apparatus for image compensation according to an embodiment of the disclosure. As illustrated in FIG. 8, the apparatus 20 for image compensation includes a coordinate determination unit 201, a compensation coefficient determination unit 202 and a compensation unit 203.

The coordinate determination unit 201 is configured to determine a row coordinate and a column coordinate for each of at least one pixel.

The compensation coefficient determination unit 202 is configured to: symmetrically map a row coordinate and a column coordinate of each of pixels (located in an edge region of the curved screen) of the at least one pixel, respectively, to obtain a target row coordinate and a target column coordinate of the pixel; and determine a compensation coefficient of the pixel based on the target row coordinate of the pixel or the target column coordinate of the pixel.

The compensation unit 203 is configured to determine a target pixel value of the pixel based on the compensation coefficient of the pixel and an original pixel value of the pixel.

It should be noted that, as illustrated in FIG. 8, the compensation coefficient determination unit 202 is connected between the coordinate determination unit 201 and the compensation unit 203.

The coordinate determination unit 201 transmits the determined row coordinate and column coordinate to the compensation coefficient determination unit 202. After receiving the row coordinate and the column coordinate, the compensation coefficient determination unit 202 is configured to: determine whether the corresponding pixel is located in the edge region; in case that the pixel is located in the edge region, symmetrically map the row coordinate to obtain the target row coordinate, and symmetrically map the column coordinate to obtain the target column coordinate; and transmit the compensation coefficient to the compensation unit 203 after calculating the compensation coefficient.

The compensation unit 203 is configured to receive the compensation coefficient and the original pixel value, and perform calculation to obtain the target pixel value.

Figure 9:
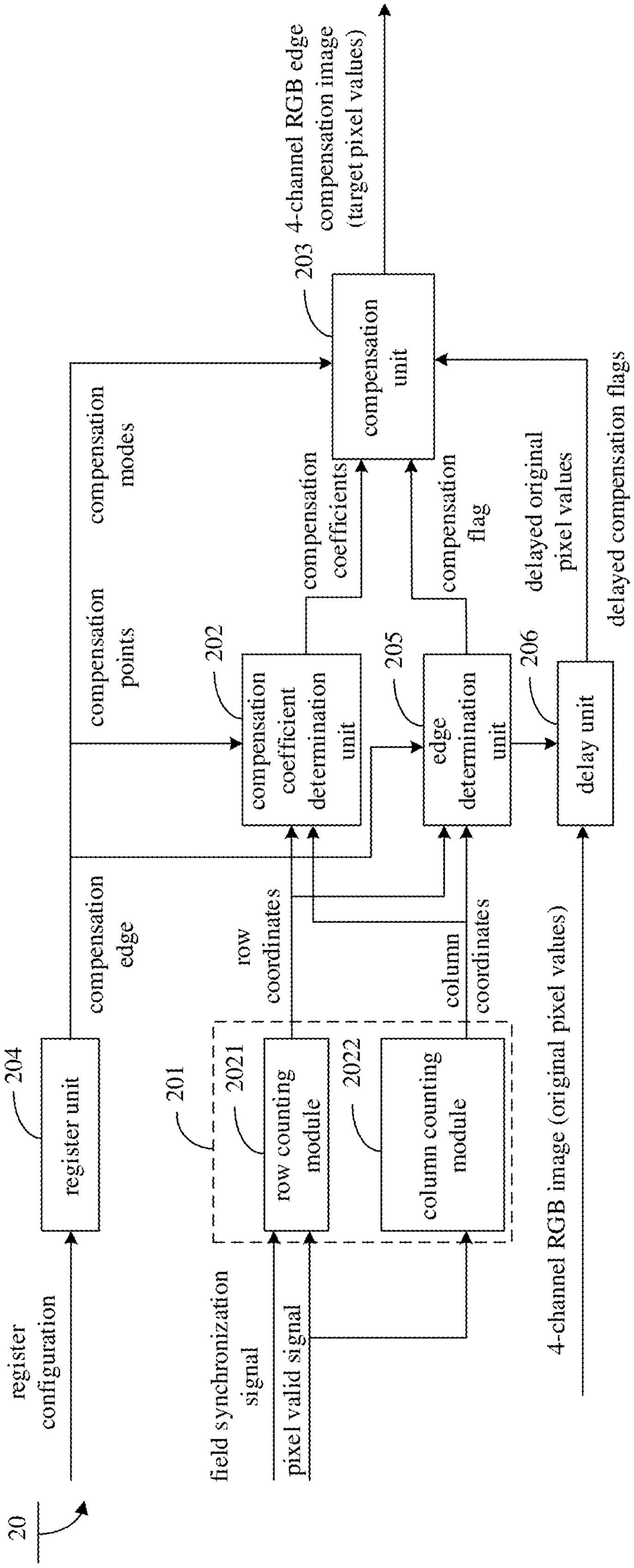
FIG. 9 is a second schematic diagram of the compositional structure of an apparatus for image compensation according to an embodiment of the disclosure.

Based on FIG. 8, FIG. 9 is a detailed structural schematic diagram of a compensation apparatus according to an embodiment of the disclosure. As illustrated in FIG. 9, in some embodiments, the at least one pixel is the first number of pixels that are consecutive pixels in a row of an image, and the coordinate determination unit 201 includes a row counting module 2011 and a column counting module 2012.

The row counting module 2011 is configured to: receive a field synchronization signal and a pixel valid signal; perform row counting based on the field synchronization signal and the pixel valid signal; and determine a row coordinate of each of the at least one pixel. The field synchronization signal is valid within a scanning time of one frame of an image, and the pixel valid signal is valid within a scanning time of one row of pixels.

The column counting module 2022 is configured to: receive the pixel valid signal; perform column counting based on the pixel valid signal; and determine a column coordinate of each of the at least one pixel. The first number of pixels have identical row coordinates and different column coordinates.

It should be noted that, as illustrated in FIG. 9, the row counting module 2021 and the column counting module 2022 are each connected to the compensation coefficient determination unit 202, and respectively transmit the row coordinates and the column coordinates obtained by counting to the compensation coefficient determination unit 202.

It should also be noted that, in conjunction with the description of the foregoing embodiments, the column counting module 2022 determines the column coordinates of the multi-channel pixels simultaneously, and therefore, the column counting module 2022 is also referred to as the multi-channel column counting module 2022. More specifically, the column counting module 2022 may include the first number of column counting sub-modules; each of column counting sub-modules corresponds one-to-one to the first number of pixel channels, receives the pixel valid signal, respectively, and performs column counting to determine the column coordinate of each of the pixels corresponding to the pixel channels.

In some embodiments, as illustrated in FIG. 9, the apparatus 20 for image compensation further includes a register unit.

The register unit 204 is configured to obtain image resolution, an edge row coordinate and an edge column coordinate. The edge row coordinate corresponds to a boundary between the first vertical edge region or the second vertical edge region and a non-edge region of the curved screen, and the edge column coordinate corresponds to a boundary between the first horizontal edge region or the second horizontal edge region and the non-edge region.

The compensation coefficient determination unit 202 is configured to determine a symmetrical edge row coordinate symmetrical to the edge row coordinate and a symmetrical edge column coordinate symmetrical to the edge column coordinate based on the image resolution, the edge row coordinate, and the edge column coordinate.

The compensation coefficient determination unit 202 is further configured to: compare the column coordinate of the pixel with the edge column coordinate and the symmetric edge column coordinate; determine the column coordinate of the pixel as the target column coordinate in case that a size relationship between the column coordinate of the pixel and the edge column coordinate is a first relationship; and determine a column coordinate symmetrical to the column coordinate of the pixel as the target column coordinate in case that a size relationship between the column coordinate of the pixel and the symmetric edge column coordinate is a second relationship. The first relationship is less than and the second relationship is greater than. Alternatively, the first relationship is greater than and the second relationship is less than.

The compensation coefficient determination unit 202 is further configured to: compare the row coordinate of the pixel with the edge row coordinate and the symmetric edge row coordinate; determine the row coordinate of the pixel as the target row coordinate in case that a size relationship between the row coordinate of the pixel and the edge row coordinate is the first relationship; and determine a row coordinate symmetrical to the row coordinate as the target row coordinate in case that a size relationship between the row coordinate of the pixel and the symmetrical edge row coordinate is the second relationship.

The register unit 204 is further configured to: obtain multiple sub-edge column coordinates, compensation coefficients corresponding to the multiple sub-edge column coordinates, multiple sub-edge row coordinates and compensation coefficients corresponding to the multiple sub-edge row coordinates. The multiple sub-edge column coordinates divide a target horizontal edge region into the second number of sub-horizontal edge regions, and the target horizontal edge region is the first horizontal edge region or the second horizontal edge region. The multiple sub-edge row coordinates divide a target vertical edge region into the third number of sub-vertical edge regions, and the target vertical edge region is the first vertical edge region or the second vertical edge region.

The compensation coefficient determination unit 202 is further configured to: determine a sub-edge region corresponding to the pixel based on a target coordinate, herein, the target coordinate is the target row coordinate or the target column coordinate, and the sub-edge region is the sub-horizontal edge region or the sub-vertical edge region; and determine the compensation coefficient of the pixel based on a sub-edge coordinate of the sub-edge region corresponding to the pixel, a compensation coefficient corresponding to the sub-edge coordinate, and the target coordinate of the pixel, herein, the sub-edge coordinate is the sub-edge row coordinate or the sub-edge column coordinate.

It should be noted that the register unit 204 is also referred to as a user module. The register unit 204 is connected to the compensation coefficient determination unit 202, and is mainly used for obtaining and storing some preset register configuration information, such as the image resolution, the edge coordinates (the edge row coordinates and the edge column coordinates, which are used for determining the edge region, as denoted as the compensation edge in FIG. 9), the sub-edge coordinates and the compensation coefficients corresponding to the sub-edge coordinates (as denoted as the compensation points in FIG. 9), the compensation modes, etc.; and used for transmitting these register configuration information to other units that are connected (or other units read the required register configuration from the register unit) for use by other units.

In some embodiments, as illustrated in FIG. 9, the compensation coefficient includes sub-compensation coefficients corresponding to the fourth number of color components.

The compensation coefficient determination unit 202 is further configured to: perform linear interpolation calculation based on the sub-edge coordinate of the sub-edge region, a sub-compensation coefficient corresponding to the sub-edge coordinate, and the target coordinate of the pixel; and determine a respective sub-compensation coefficient for each of the color components of the pixel.

In some embodiments, the register unit 204 is further configured to store a compensation mode.

The compensation unit 203 is further configured to: obtain the original pixel value of the pixel; perform a normalization operation on the sub-compensation coefficient for each of the color components of the pixel based on the compensation mode; and perform a weighting calculation on the original pixel value of the pixel based on the sub-compensation coefficient for each of the color components after the normalization operation, to obtain the target pixel value of the pixel.

In some embodiments, the apparatus for image compensation 20 further includes an edge determination unit 205 and a delay unit 206.

The edge determination unit 205 is configured to: for each of the at least one pixel, determine whether the pixel is located in the edge region; and in case that the pixel is located in the edge region generate a compensation flag that is valid.

The delay unit 206 is configured to: delay the compensation flag and the original pixel value, respectively, to enable a timing of the compensation flag being consistent with a timing of the original pixel values.

The compensation unit 203 is configured to: in case that the delayed compensation flag is valid, generate a target image based on the target pixel values; and in case that the delayed compensation flag is invalid, generate the target image based on the original pixel values.

In some embodiments, the edge determination unit 205 is configured to: for each of the at least one pixel, determine whether the pixel of the at least one pixel is located in the edge region based on the image resolution, the edge row coordinate, the edge column coordinate, and the row coordinate and the column coordinate of the pixel. Alternatively, the edge determination unit 205 is configured to: for each of the at least one pixel, determine whether the pixel of the at least one pixel is located in the edge region based on the image resolution, the edge row coordinate, the edge column coordinate, the target row coordinate and the target column coordinate of the pixel.

It should be noted that, as illustrated in FIG. 9, the edge determination unit 205 is connected to the row counting module 2011 in the coordinate determination unit 201 to receive the row coordinate, and connected to the column counting module 2012 in the coordinate determination unit 201 to receive the column coordinate. The edge determination unit may also be connected to the register unit 204 to: receive the image resolution and the edge coordinate; determine whether the corresponding pixel is located in edge region based on the image resolution and the edge coordinate; and generate a corresponding compensation flag.

Alternatively, the edge determination unit 205 may be further connected to the compensation coefficient determination unit 202. The compensation coefficient determination unit 202 transmits the target row coordinate and the target column coordinate to the edge determination unit 205, to enable the edge determination unit 205 to: determine whether the corresponding pixel is located in edge region based on the image resolution and the edge coordinate, and generate the corresponding compensation flag.

It should also be noted that, in case that the edge determination unit 205 can interaction with the compensation coefficient determination unit 202, the edge determination unit may also obtain the symmetric edge row coordinate and the symmetric edge column coordinate provided by the compensation coefficient determination unit 202 without obtaining the edge coordinate from the register unit 204, in order to determine whether the pixel is located in the edge region, which are not specifically limited in the embodiments of the disclosure.

In addition, as illustrated in FIG. 9, the 4-channel RGB image represents the original pixel values, and the 4-channel RGB edge compensation image represents the target pixel values.

It should be noted that the apparatus 20 for image compensation provided in the embodiment of the disclosure is configured to implement the method for image compensation in the foregoing embodiments. Details not disclosed in this embodiment are understood with reference to the description of the foregoing embodiments, which will not be repeated here.

In summary, as illustrated in FIG. 9, the apparatus 20 for image compensation (or the system for image compensation, etc.) provided in the embodiment of the disclosure may include: a register unit 204 (also referred to as a user module), a row counting module 2021, a column counting module 2022 (also referred to as a multi-channel column counting module), an edge determination unit 205 (also referred to as a compensation edge generation module), a compensation coefficient determination unit 202 (also referred to as a symmetric gain interpolation calculation module), a delay unit 206 (also referred to as a delay module), and a compensation unit 203 (also referred to as a gain compensation module).

The register unit 204 stores edge compensation setting information, including the image resolution, the horizontal/vertical compensation edge pixel positions (i.e., the edge coordinates=the compensation edges in FIG. 9), the corresponding RGB gain compensation coefficients (i.e., the sub-compensation coefficient of each color component=the compensation point in FIG. 9), the compensation modes, and the like. As illustrated in FIG. 9, this setting information can be configured by the register. Here, it can be understood in conjunction with the timing diagram illustrated in FIG. 3.

The row counting module 2021 performs row counting for the valid pixel region of the inputted image data stream by using the pixel valid signal, that is, obtains the real-time row coordinate of the image.

The column counting module 2022 performs column counting for each channel (e.g., 4 channels in FIG. 3) of the inputted image data stream by using the pixel valid signal, that is, the image column coordinate the corresponding to each channel in real time.

The edge determination unit 205: calculates the symmetrical edge compensation region range (i.e. the edge region) in the horizontal and vertical directions of the image based on the maximum pixel position of the horizontal/vertical compensation edge and the image resolution; and determines whether the row coordinate and multi-channel column coordinates obtained by real-time statistics are within the compensation range; if yes, the outputted horizontal/vertical compensation flag at the corresponding position is valid, otherwise, the outputted horizontal/vertical compensation flag at the corresponding position is invalid.

The compensation coefficient determination unit 202: performs symmetrical mapping processing on the real-time row/column coordinate of the image based on the maximum compensation edge in the horizontal/vertical direction, and the mapping manner is as formula (1) to formula (4) described above; and performs one-dimensional linear interpolation calculation on the target row coordinate and the target column coordinate in the processed edge region, respectively, to obtain the compensation coefficient at the corresponding pixel position. Specific calculations are as formula (5) to formula (7) described above.

The delay unit 206 delays the inputted 4-channel image data (that is, the initial pixel value of each pixel), the horizontal compensation flag and the vertical compensation flag, to maintain the synchronization of the valid pixel compensation positions.

The compensation unit 203: selects the corresponding compensation pixel gain based on the different compensation mode. Based on the different compensation edge positions: in case that the edge compensation function is enabled in the horizontal direction, the weighting coefficient adjustment (such as multiplying) is performed for the sub-compensation coefficients of the 4-channel in the horizontal direction which are obtained through interpolation and the 4-channel RGB original data (the original pixel values) within the valid compensation edge, respectively, to obtain the target pixel value; in case that the edge compensation function is enabled in the vertical direction, the weighting coefficient adjustment (such as multiplying) is performed for the sub-compensation coefficients in the vertical direction obtained through interpolation and the RGB original data (the original pixel values) within the valid compensation edge, respectively, to obtain the target pixel value. Finally, the image result after compensating the pixels of the edge region is output, that is, the 4-channel RGB edge compensation image in FIG. 9.

Briefly, as illustrated in FIG. 9 and FIG. 3, the operation principle of the apparatus 20 for image compensation is as follows.

(1) For the 4-channel image data stream input continuously: firstly, the pixel valid signal is inputted into the row counting module 2021 and the column counting module 2022 to generate the row coordinate and the column coordinate of the image in real time; and then, the horizontal/vertical compensation edge maximum pixel position (that is, the edge coordinate) is configured by the register and inputted to the edge determination unit 205; the edge determination unit 205 generates corresponding compensation flag in real time by determining whether the real-time row and column coordinates of the image are within the range of the edge region. As illustrated in FIG. 3, the 4-channel horizontal edge compensation flags Comp_flag_HC1 to Comp_flag_HC4 in units of pixels and the vertical edge compensation flag Comp_flag_VC in units of rows of the image are respectively illustrated.

(2) The compensation coefficient determination unit 202 divides the horizontal/vertical edge region into multiple compensation regions by receiving the multiple compensation positions (the sub-edge coordinates) and the compensation coefficient corresponding to each sub-edge coordinate configured by the register. Then, by receiving the row coordinate and the 4-channel column coordinates of the image generated in real time by the row counting module and the column counting modules in real time, the compensation coefficient determination unit 202 performs symmetrical mapping processing on the row and column coordinates of the image based on the maximum compensation edge in horizontal/vertical direction by using formula (1) to formula (4). The pixel coordinates in the non-edge region are set as: the value of the edge coordinate+1, and the mapping result of which is illustrated in FIG. 5, to ensure that the horizontal two sides of the image and the top and bottom sides in the vertical direction of the image are symmetrically interpolated, and the compensation coefficients obtained by the interpolation are symmetrically changed with the image edge as the center. Then, the compensation interval corresponding to the pixel is determined based on the target row coordinate and the target column coordinate obtained through mapping, the compensation coefficient at this coordinate is approximated by using piecewise linear interpolation, and the overall image interpolation manner is illustrated in FIG. 6.

(3) Due to multiple clock cycles required for the above-mentioned operation (2) to perform regional interpolation calculation, in order to ensure that the image pixels at the first row, the image horizontal and vertical edge compensation flags, and the compensation gain value can be input to the compensation unit 203 for calculation at the same time, the above-mentioned signals are also delayed respectively.

(4) The compensation unit 203 is controlled by the register unit 204, and selects different compensation modes based on the degree of the color deviation of the screen, as specifically described in the foregoing embodiments, which will not be repeated here.

It is to be understood that in the embodiment, the "unit" may be a partial circuit, a partial processor, a partial program or software, or the like, and may of course be a module, or may also be non-modular. Moreover, the various component in the embodiment may be integrated into one processing unit, or they may be physically exist separately as individual units, or two or more units may be integrated into one unit. The above-described integrated unit may be implemented in the form of hardware or software functional modules.

The integrated unit, if implemented in the form of software function modules and not sold or used as an independent product, may be stored in a computer-readable storage medium. Based on this understanding, the technical solutions of the embodiments essentially or part of that contributes to some implementations or all or part of the technical solutions may be embodied in the form of a software product. The computer software product is stored in a storage medium that includes several instructions, which cause a computer device (which may be a personal computer, a server, or a network device, etc.) or a processor to perform all or part of operations of the methods described in the embodiments. The above-mentioned storage medium includes various media capable of storing program codes, such as U disk, mobile hard disk, read only memory (ROM), random access memory (RAM), magnetic disk or optical disk.

Accordingly, the embodiment provides a computer storage medium having stored thereon a computer program that when executed by at least one processor, implements operations of the method for image compensation of any one of the preceding embodiments.

The embodiment also provides a computer program product, the computer program product includes a computer program that, when executed by at least one processor, implements operations of the method for image compensation of any one of the preceding embodiments.

Figure 10:
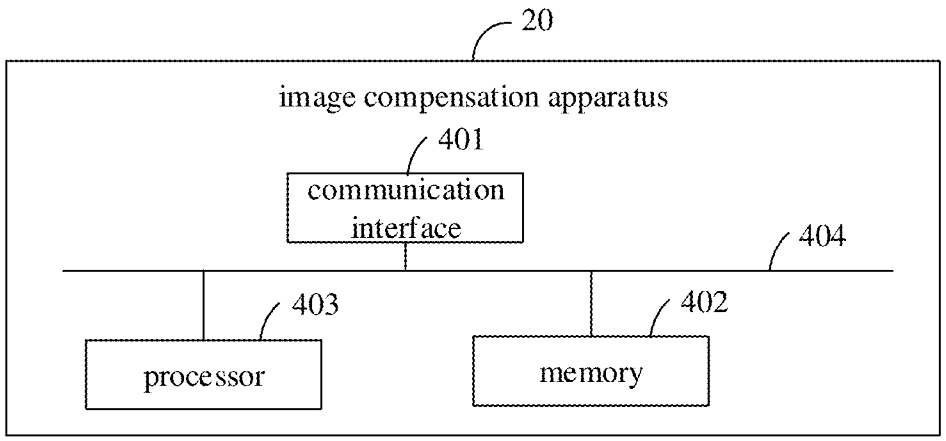
FIG. 10 is a third schematic diagram of the compositional structure of an apparatus for image compensation according to an embodiment of the disclosure.

Based on the computer storage medium and the computer program product described above, FIG. 10 is a third schematic diagram of the compositional structure of an apparatus for image compensation according to an embodiment of the disclosure. As illustrated in FIG. 10, the apparatus 20 for image compensation may include: a communication interface 401, a memory 402, and a processor 403. The various components are coupled together via a bus system 404. It is understood that the bus system 404 is configured to enable connection and communication between these components. In addition to a data bus, the bus system 404 further includes a power bus, a control bus, and a status signal bus. However, for the sake of clarity, the various buses are labeled in FIG. 10 as the bus system 404. The communication interface 401 is configured to receive and transmit signals during the process of transmitting and receiving information to and from other external network elements.

The memory 402 is configured to store a computer program executable on the processor 403.

The processor 403 is configured to, when executing the computer program, implements the method for image compensation of any one of the preceding embodiments.

It is understood that in the embodiment of the disclosure, the memory 402 may be a volatile memory or a non-volatile memory, or include both a volatile memory and a non-volatile memory. The non-volatile memory may be a Read-Only Memory (ROM), a Programmable ROM (PROM), an Erasable PROM (EPROM), an Electrically EPROM (EE- PROM), or a flash memory. The volatile memory may be a Random Access Memory (RAM), which serves as an external cache. By way of illustration, but not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchronous link DRAM (SLDRAM) and a Direct Rambus RAM (DRRAM). The memory 402 of the systems and methods described herein is intended to include but not limited to these and any other suitable types of memories.

The processor 403 may be an integrated circuit chip with a signal processing capability. In implementation, the operations of the above methods may be accomplished by an integrated logic circuit of the hardware in the processor 403 or the instructions in the form of software. The processor 403 described above may be a general-purpose processor, a Digital Signal Processor (DSP), an Application Specific Integrated Circuit (ASIC), a Field Programmable Gate Array (FPGA) or other programmable logic devices, a discrete gate or transistor logic device, or a discrete hardware component. The methods, operations and logic block diagrams disclosed in embodiments of the disclosure may be implemented or performed. The general purpose processor may be a microprocessor, or may be any conventional processor or the like. The operations of the methods disclosed combined with embodiments of the disclosure may be directly embodied as execution of a hardware decoding processor or execution of a combination of a hardware module and a software module in the decoding processor. The software module may be located in a storage medium mature in the art, such as a random access memory, a flash memory, a read-only memory, a programmable read-only memory, or an electrically erasable and programmable memory, a register, etc. The storage medium is located in the memory 402, and the processor 403 reads information in the memory 402 and completes the operations of the method described above in combination with its hardware.

It is to be understood that these embodiments described herein may be implemented in hardware, software, firmware, middleware, microcode, or combinations thereof. For implemented in hardware, the processing unit may be implemented in one or more Application Specific Integrated Circuits (ASIC), a Digital Signal Processor (DSP), a Digital Signal Processing Device (DSPD), a Programmable Logic Devices (PLD), a Field-Programmable Gate Arrays (FPGA), a general purpose processor, a controller, a microcontroller, a microprocessor, other electronic units for performing the functions described in the disclosure, or combinations thereof.

For implemented in software, the techniques described herein may be implemented through modules (e.g., procedures, functions, etc.) that perform the functions described herein. The software code may be stored in the memory and executed by the processor. The memory may be implemented in the processor or external to the processor.

Figure 11:
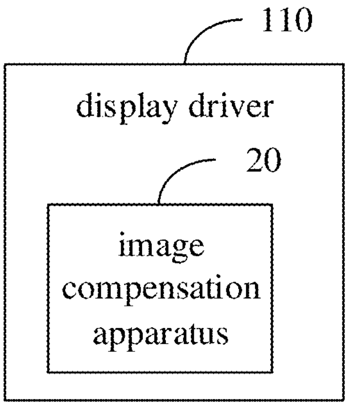
FIG. 11 is a schematic diagram of the compositional structure of a display driver according to an embodiment of the disclosure.

In yet another embodiment of the disclosure, FIG. 11 is a schematic diagram of the compositional structure of a display driver according to an embodiment of the disclosure. As illustrated in FIG. 11, the display driver 110 includes the apparatus 20 for image compensation of any one of the preceding embodiments.

Figure 12:
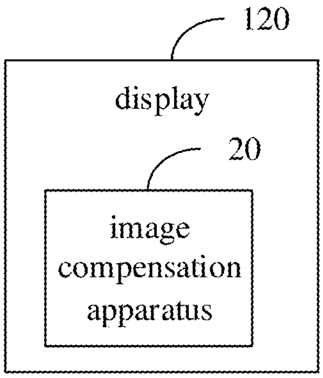
FIG. 12 is a schematic diagram of the compositional structure of a display according to an embodiment of the disclosure.

In yet another embodiment of the disclosure, FIG. 12 is a schematic diagram of the compositional structure of a display according to an embodiment of the disclosure. As illustrated in FIG. 12, the display 120 includes the apparatus 20 for image compensation of any one of the preceding embodiments.

In yet another embodiment of the disclosure, an electronic device is further provided. The electronic device 30 includes the apparatus 20 for image compensation of any one of the preceding embodiments, or includes the display driver 110 of the preceding embodiment, or includes the display 120 of the preceding embodiment.

The above is only preferred embodiments of the disclosure and is not intended to limit the scope of protection of the disclosure.

It should be noted that the terms "including", "containing" or any other variation thereof in the disclosure are intended to encompass non-exclusive inclusion, so that a process, a method, an object or an apparatus that includes a series of elements includes not only those elements but also other elements that are not explicitly listed or elements that are inherent in the process, the method, the object or the apparatus. Without further limitation, the element limited by the phrase "includes a . . . " does not preclude the existence of another identical element in the process, the method, the object or the apparatus in which the element is included.

The above-described serial numbers of embodiments of the disclosure are for description only, and do not represent the advantages and disadvantages of the embodiments.

The methods disclosed in several method embodiments provided in the disclosure can be arbitrarily combined without conflict to obtain new method embodiments.

The features disclosed in several product embodiments provided in the disclosure can be arbitrarily combined without conflict to obtain new product embodiments.

The features disclosed in several method embodiments or device embodiments provided in the disclosure may be arbitrarily combined without conflict to obtain new method embodiments or device embodiments.

The above description is only the specific embodiments of the disclosure; however, the scope of protection of the disclosure is not limited thereto. Any change or replacement easily conceivable by the skilled person familiar with the technical field within the technical scope disclosed by the disclosure shall fall in the scope of protection of the disclosure. Therefore, the scope of protection of the disclosure should be subject to the scope of protection of the claims.

The invention claimed is:

1. An apparatus for image compensation, applied to an electronic device with a curved screen, the apparatus comprising:

a processor; and a memory configured to store an instruction executable on the processor, wherein the processor is configured to:

determine a row coordinate and a column coordinate for each of at least one pixel;

for each of pixels, located in an edge region of the curved screen, of the at least one pixel, symmetrically map a row coordinate of the pixel to obtain a target row coordinate of the pixel; symmetrically map a column coordinate of the pixel to obtain a target column coordinate of the pixel; and determine a compensation coefficient of the pixel based on the target row coordinate of the pixel or the target column coordinate of the pixel; wherein the target row coordinate of the pixel is the row coordinate of the pixel or a row coordinate symmetrical to the row coordinate of the pixel, the target column coordinate of the pixel is the column coordinate of the pixel or a column coordinate symmetrical to the column coordinate of the pixel, coordinates of pixels on both symmetrical sides of the curved screen are mapped to identical coordinates, and symmetrical pixels located in the edge region of the curved screen adopt an identical compensation coefficient; and determine a target pixel value of the pixel based on the compensation coefficient of the pixel and an original pixel value of the pixel.

2. The apparatus of claim 1, wherein the at least one pixel is a first number of pixels that are consecutive pixels in a row of an image, the apparatus further comprises a communication interface, and the processor is further configured to:

control the communication interface to receive a field synchronization signal and a pixel valid signal, perform row counting based on the field synchronization signal and the pixel valid signal; and determine the row coordinate of each of the at least one pixel; wherein the field synchronization signal is valid within a scanning time of one frame of the image, and the pixel valid signal is valid within a scanning time of one row of pixels; and perform column counting based on the pixel valid signal; and determine the column coordinate of each of the at least one pixel; wherein the first number of pixels have identical row coordinates and different column coordinates.

3. The apparatus of claim 1, wherein the edge region comprises: a first horizontal edge region and a second horizontal edge region which are symmetrically distributed on opposite sides of the curved screen in a row direction, a first vertical edge region and a second vertical edge region which are symmetrically distributed on opposite sides of the curved screen in a column direction;

wherein the memory is configured to obtain an image resolution, an edge row coordinate and an edge column coordinate; wherein the edge row coordinate corresponds to a boundary between the first vertical edge region or the second vertical edge region and a non-edge region of the curved screen, and the edge column coordinate corresponds to a boundary between the first horizontal edge region or the second horizontal edge region and the non-edge region;

wherein the processor is further configured to determine a symmetrical edge row coordinate symmetrical to the edge row coordinate and a symmetrical edge column coordinate symmetrical to the edge column coordinate based on the image resolution, the edge row coordinate, and the edge column coordinate;

wherein the processor is further configured to: compare the column coordinate of the pixel with the edge column coordinate and the symmetrical edge column coordinate; determine the column coordinate of the pixel as the target column coordinate of the pixel in a case that a size relationship between the column coordinate of the pixel and the edge column coordinate is a first relationship; and determine the column coordinate symmetrical to the column coordinate of the pixel as the target column coordinate of the pixel in a case that a size relationship between the column coordinate of the pixel and the symmetrical edge column coordinate is a second relationship; wherein the first relationship is less than and the second relationship is greater than; or, the first relationship is greater than and the second relationship is less than; and wherein the processor is further configured to: compare the row coordinate of the pixel with the edge row coordinate and the symmetrical edge row coordinate; determine the row coordinate of the pixel as the target row coordinate of the pixel in a case that a size relationship between the row coordinate of the pixel and the edge row coordinate is the first relationship; and determine the row coordinate symmetrical to the row coordinate of the pixel as the target row coordinate of the pixel in a case that a size relationship between the row coordinate of the pixel and the symmetrical edge row coordinate is the second relationship.

4. The apparatus of claim 3, wherein the memory is further configured to: obtain a plurality of sub-edge column coordinates, compensation coefficients corresponding to the plurality of sub-edge column coordinates, a plurality of sub-edge row coordinates and compensation coefficients corresponding to the plurality of sub-edge row coordinates; wherein the plurality of sub-edge column coordinates divide a target horizontal edge region into a second number of sub-horizontal edge regions, the target horizontal edge region is the first horizontal edge region or the second horizontal edge region, and the plurality of sub-edge row coordinates divide a target vertical edge region into a third number of sub-vertical edge regions, the target vertical edge region is the first vertical edge region or the second vertical edge region; and the processor is further configured to: determine a sub-edge region corresponding to the pixel based on a target coordinate, wherein the target coordinate is the target row coordinate of the pixel or the target column coordinate of the pixel, and the sub-edge region is a sub-horizontal edge region or a sub-vertical edge region; and determine the compensation coefficient of the pixel based on a sub-edge coordinate of the sub-edge region corresponding to the pixel, a compensation coefficient corresponding to the sub-edge coordinate, and the target coordinate of the pixel, wherein the sub-edge coordinate is a sub-edge row coordinate of the plurality of sub-edge row coordinates or a sub-edge column coordinate of the plurality of sub-edge column coordinates.

5. The apparatus of claim 4, wherein the compensation coefficient of the pixel comprise sub-compensation coefficients corresponding to a fourth number of color components; and the processor is further configured to: perform linear interpolation calculation based on the sub-edge coordinate of the sub-edge region, the sub-compensation coefficient corresponding to the sub-edge coordinate, and the target coordinate of the pixel; and determine a respective sub-compensation coefficient for each of the color components of the pixel.

6. The apparatus of claim 5, wherein the memory is further configured to store a compensation mode; and the processor is further configured to: obtain the original pixel value of the pixel; perform a normalization operation on the sub-compensation coefficient for each of the color components of the pixel based on the compensation mode; and perform a weighting calculation on the original pixel value of the pixel based on the sub-compensation coefficient for each of the color components after the normalization operation, to obtain the target pixel value of the pixel.

7. The apparatus of claim 3, wherein the processor is further configured to:

for each of the at least one pixel, determine whether the pixel of the at least one pixel is located in the edge region; and in a case that the pixel of the at least one pixel is located in the edge region, generate a compensation flag that is valid;

delay the compensation flag and the original pixel value, respectively, to enable a timing of the compensation flag being consistent with a timing of the original pixel value; and in a case that the delayed compensation flag is valid, generate a target image based on the target pixel values; and in a case that the delayed compensation flag is invalid, generate the target image based on the original pixel values.

8. The apparatus of claim 7, wherein the processor is further configured to:

for each of the at least one pixel, determine whether the pixel of the at least one pixel is located in the edge region based on the image resolution, the edge row coordinate, the edge column coordinate, and the row coordinate and the column coordinate of the pixel; or, determine whether the pixel of the at least one pixel is located in the edge region based on the image resolution, the edge row coordinate, the edge column coordinate, the target row coordinate and the target column coordinate of the pixel.

9. A display driver, comprising the apparatus for image compensation of claim 1.

10. A method for image compensation, applied to an electronic device with a curved screen, the method comprising:

determining a row coordinate and a column coordinate for each of at least one pixel;

determining whether a pixel is located in an edge region of the curved screen;

in a case that the pixel is located in the edge region, symmetrically mapping the row coordinate of the pixel to obtain a target row coordinate of the pixel; and symmetrically mapping the column coordinate of the pixel to obtain a target column coordinate of the pixel; and determining a compensation coefficient of the pixel based on the target row coordinate of the pixel or the target column coordinate of the pixel; wherein the target row coordinate of the pixel is the row coordinate of the pixel or a row coordinate symmetrical to the row coordinate of the pixel, the target column coordinate of the pixel is the column coordinate of the pixel or a column coordinate symmetrical to the column coordinate of the pixel, coordinates of pixels on both symmetrical sides of the curved screen are mapped to identical coordinates, and symmetrical pixels located in the edge region of the curved screen adopt an identical compensation coefficient; and determining a target pixel value of the pixel based on the compensation coefficient of the pixel and an original pixel value of the pixel.

11. The method of claim 10, wherein the at least one pixel is a first number of pixels that are consecutive pixels in a row of an image, and wherein determining the row coordinate and the column coordinate for each of the at least one pixel comprises:

receiving a field synchronization signal and a pixel valid signal, wherein the field synchronization signal is valid within a scanning time of one frame of the image, and the pixel valid signal is valid within a scanning time of one row of pixels;

performing row counting based on the field synchronization signal and the pixel valid signal, and determining the row coordinate of each of the at least one pixel; and performing column counting based on the pixel valid signal; and determining the column coordinate of each of the at least one pixel;

wherein the first number of pixels have identical row coordinates and different column coordinates.

12. The method of claim 10, wherein the edge region comprises: a first horizontal edge region and a second horizontal edge region which are symmetrically distributed on opposite sides of the curved screen in a row direction, a first vertical edge region and a second vertical edge region which are symmetrically distributed on opposite sides of the curved screen in a column direction;

wherein the method further comprises:

obtaining an image resolution, an edge row coordinate and an edge column coordinate; wherein the edge row coordinate corresponds to a boundary between the first vertical edge region or the second vertical edge region and a non-edge region of the curved screen, and the edge column coordinate corresponds to a boundary between the first horizontal edge region or the second horizontal edge region and the non-edge region;

determining a symmetrical edge row coordinate symmetrical to the edge row coordinate and a symmetrical edge column coordinate symmetrical to the edge column coordinate based on the image resolution, the edge row coordinate, and the edge column coordinate;

wherein symmetrically mapping the column coordinate of the pixel to obtain the target column coordinate of the pixel comprises:

comparing the column coordinate of the pixel with the edge column coordinate and the symmetrical edge column coordinate;

determining the column coordinate of the pixel as the target column coordinate of the pixel in a case that a size relationship between the column coordinate of the pixel and the edge column coordinate is a first relationship; and determining the column coordinate symmetrical to the column coordinate of the pixel as the target column coordinate of the pixel in a case that a size relationship between the column coordinate of the pixel and the symmetrical edge column coordinate is a second relationship;

wherein the first relationship is less than and the second relationship is greater than; or, the first relationship is greater than and the second relationship is less than;

wherein symmetrically mapping the row coordinate of the pixel to obtain the target row coordinate of the pixel comprises:

comparing the row coordinate of the pixel with the edge row coordinate and the symmetrical edge row coordinate;

determining the row coordinate of the pixel as the target row coordinate of the pixel in a case that a size relationship between the row coordinate of the pixel and the edge row coordinate is the first relationship; and determining the row coordinate symmetrical to the row coordinate of the pixel as the target row coordinate of the pixel in a case that a size relationship between the row coordinate of the pixel and the symmetrical edge row coordinate is the second relationship.

13. The method of claim 12, wherein the method further comprises:

obtaining a plurality of sub-edge column coordinates, compensation coefficients corresponding to the plurality of sub-edge column coordinates, a plurality of sub-edge row coordinates and compensation coefficients corresponding to the plurality of sub-edge row coordinates; wherein the plurality of sub-edge column coordinates divide a target horizontal edge region into a second number of sub-horizontal edge regions, the target horizontal edge region is the first horizontal edge region or the second horizontal edge region, and the plurality of sub-edge row coordinates divide a target vertical edge region into a third number of sub-vertical edge regions, the target vertical edge region is the first vertical edge region or the second vertical edge region; and wherein determining the compensation coefficient of the pixel based on the target row coordinate of the pixel or the target column coordinate of the pixel comprises:

determining a sub-edge region corresponding to the pixel based on a target coordinate, wherein the target coordinate is the target row coordinate of the pixel or the target column coordinate of the pixel, and the sub-edge region is a sub-horizontal edge region or a sub-vertical edge region; and determining the compensation coefficient of the pixel based on a sub-edge coordinate of the sub-edge region corresponding to the pixel, a compensation coefficient corresponding to the sub-edge coordinate, and the target coordinate of the pixel, wherein the sub-edge coordinate is a sub-edge row coordinate of the plurality of sub-edge row coordinates or a sub-edge column coordinate of the plurality of sub-edge column coordinates.

14. The method of claim 13, wherein the compensation coefficient of the pixel comprise sub-compensation coefficients corresponding to a fourth number of color components; and wherein determining the compensation coefficient of the pixel based on the sub-edge coordinate of the sub-edge region corresponding to the pixel, the compensation coefficient corresponding to the sub-edge coordinate, and the target coordinate of the pixel comprises:

performing linear interpolation calculation based on the sub-edge coordinate of the sub-edge region, the sub-compensation coefficient corresponding to the sub-edge coordinate, and the target coordinate of the pixel; and determining a respective sub-compensation coefficient for each of the color components of the pixel.

15. The method of claim 14, wherein determining the target pixel value of the pixel based on the compensation coefficient of the pixel and the original pixel value of the pixel comprises:

obtaining the original pixel value of the pixel;

determining a compensation mode;

performing a normalization operation on the sub-compensation coefficient for each of the color components of the pixel based on the compensation mode; and performing a weighting calculation on the original pixel value of the pixel based on the sub-compensation coefficient for each of the color components after the normalization operation, to obtain the target pixel value of the pixel.

16. The method of claim 12, wherein determining whether the pixel is located in the edge region of the curved screen comprises:

determining whether the pixel is located in the edge region based on the image resolution, the edge row coordinate, the edge column coordinate, and the row coordinate and the column coordinate of the pixel; or, determine whether the pixel of the at least one pixel is located in the edge region based on the image resolution, the edge row coordinate, the edge column coordinate, the target row coordinate and the target column coordinate of the pixel.

17. The method of claim 16, wherein the method further comprises:

in a case that the pixel is located in the edge region, generating a compensation flag that is valid;

delaying the compensation flag and the original pixel value, respectively, to enable a timing of the compensation flag being consistent with a timing of the original pixel value; and in a case that the delayed compensation flag is valid, generating a target image based on the target pixel values; and in a case that the delayed compensation flag is invalid, generating the target image based on the original pixel values.

18. A display, comprising an apparatus for image compensation, the apparatus is applied to an electronic device with a curved screen, wherein the apparatus comprises:

a processor; and a memory configured to store an instruction executable on the processor, wherein the processor is configured to:

determine a row coordinate and a column coordinate for each of at least one pixel;

for each of pixels, located in an edge region of the curved screen, of the at least one pixel, symmetrically map a row coordinate of the pixel to obtain a target row coordinate of the pixel; symmetrically map a column coordinate of the pixel to obtain a target column coordinate of the pixel; and determine a compensation coefficient of the pixel based on the target row coordinate of the pixel or the target column coordinate of the pixel; wherein the target row coordinate of the pixel is the row coordinate of the pixel or a row coordinate symmetrical to the row coordinate of the pixel, the target column coordinate of the pixel is the column coordinate of the pixel or a column coordinate symmetrical to the column coordinate of the pixel, coordinates of pixels on both symmetrical sides of the curved screen are mapped to identical coordinates, and symmetrical pixels located in the edge region of the curved screen adopt an identical compensation coefficient; and determine a target pixel value of the pixel based on the compensation coefficient of the pixel and an original pixel value of the pixel.

19. The display of claim 18, wherein the at least one pixel is a first number of pixels that are consecutive pixels in a row of an image, the apparatus further comprises a communication interface, and the processor is further configured to:

control the communication interface to receive a field synchronization signal and a pixel valid signal, perform row counting based on the field synchronization signal and the pixel valid signal; and determine the row coordinate of each of the at least one pixel; wherein the field synchronization signal is valid within a scanning time of one frame of the image, and the pixel valid signal is valid within a scanning time of one row of pixels; and perform column counting based on the pixel valid signal; and determine the column coordinate of each of the at least one pixel; wherein the first number of pixels have identical row coordinates and different column coordinates.

20. The display of claim 18, wherein the edge region comprises: a first horizontal edge region and a second horizontal edge region which are symmetrically distributed on opposite sides of the curved screen in a row direction, a first vertical edge region and a second vertical edge region which are symmetrically distributed on opposite sides of the curved screen in a column direction;

wherein the memory is configured to obtain and store an image resolution, an edge row coordinate and an edge column coordinate; wherein the edge row coordinate corresponds to a boundary between the first vertical edge region or the second vertical edge region and a non-edge region of the curved screen, and the edge column coordinate corresponds to a boundary between the first horizontal edge region or the second horizontal edge region and the non-edge region;

wherein the processor is further configured to determine a symmetrical edge row coordinate symmetrical to the edge row coordinate and a symmetrical edge column coordinate symmetrical to the edge column coordinate based on the image resolution, the edge row coordinate, and the edge column coordinate;

wherein the processor is further configured to: compare the column coordinate of the pixel with the edge column coordinate and the symmetrical edge column coordinate; determine the column coordinate of the pixel as the target column coordinate of the pixel in a case that a size relationship between the column coordinate of the pixel and the edge column coordinate is a first relationship; and determine the column coordinate symmetrical to the column coordinate of the pixel as the target column coordinate of the pixel in a case that a size relationship between the column coordinate of the pixel and the symmetrical edge column coordinate is a second relationship; wherein the first relationship is less than and the second relationship is greater than; or, the first relationship is greater than and the second relationship is less than; and wherein the processor is further configured to: compare the row coordinate of the pixel with the edge row coordinate and the symmetrical edge row coordinate; determine the row coordinate of the pixel as the target row coordinate of the pixel in a case that a size relationship between the row coordinate of the pixel and the edge row coordinate is the first relationship; and determine the row coordinate symmetrical to the row coordinate of the pixel as the target row coordinate of the pixel in a case that a size relationship between the row coordinate of the pixel and the symmetrical edge row coordinate is the second relationship.

* * * * *